US012470294B1

(12) United States Patent
Glasnapp et al.

(10) Patent No.: US 12,470,294 B1
(45) Date of Patent: Nov. 11, 2025

(54) SYSTEM FOR INTER-SATELLITE COMMUNICATION

(71) Applicant: AMAZON TECHNOLOGIES, INC., Seattle, WA (US)

(72) Inventors: Christopher Mark Glasnapp, Renton, WA (US); Drew Carter King, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 169 days.

(21) Appl. No.: 18/454,493

(22) Filed: Aug. 23, 2023

(51) Int. Cl.
*H04B 10/00* (2013.01)
*H04B 10/118* (2013.01)
*H04J 14/00* (2006.01)

(52) U.S. Cl.
CPC ................................. *H04B 10/118* (2013.01)

(58) Field of Classification Search
CPC .................................................. H04B 10/118
See application file for complete search history.

(56) References Cited

U.S. PATENT DOCUMENTS

2023/0048194 A1* 2/2023 Wang ................... G01S 19/072
2024/0224217 A1* 7/2024 Pan ....................... H04W 52/02

\* cited by examiner

*Primary Examiner* — Daniel G Dobson
(74) *Attorney, Agent, or Firm* — Lindauer Law, PLLC

(57) ABSTRACT

A satellite constellation provides communication resources, such as optical intersatellite links (ISL), to third-party (3P) satellites. An application programming interface (API) provided by a management system associated with the constellation allows a 3P requestor to determine availability of, and schedule, communication resources. Details about the scheduled communications are returned to the 3P requestor. Once scheduled, the management system operates associated satellites to provide the scheduled communication resources. The requestor may then use the details to operate the 3P satellite to use the scheduled communication resources. At the scheduled time(s), the ISL may be used to transfer data between the 3P satellite and ground or another 3P satellite.

20 Claims, 7 Drawing Sheets

SYSTEM FOR INTER-SATELLITE COMMUNICATION

BACKGROUND

Wireless transmission of data provides many benefits. Wireless transmission using optical wavelengths such as infrared, visible light, and so forth, facilitates high data rates and dense networks with reuse of those wavelengths.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
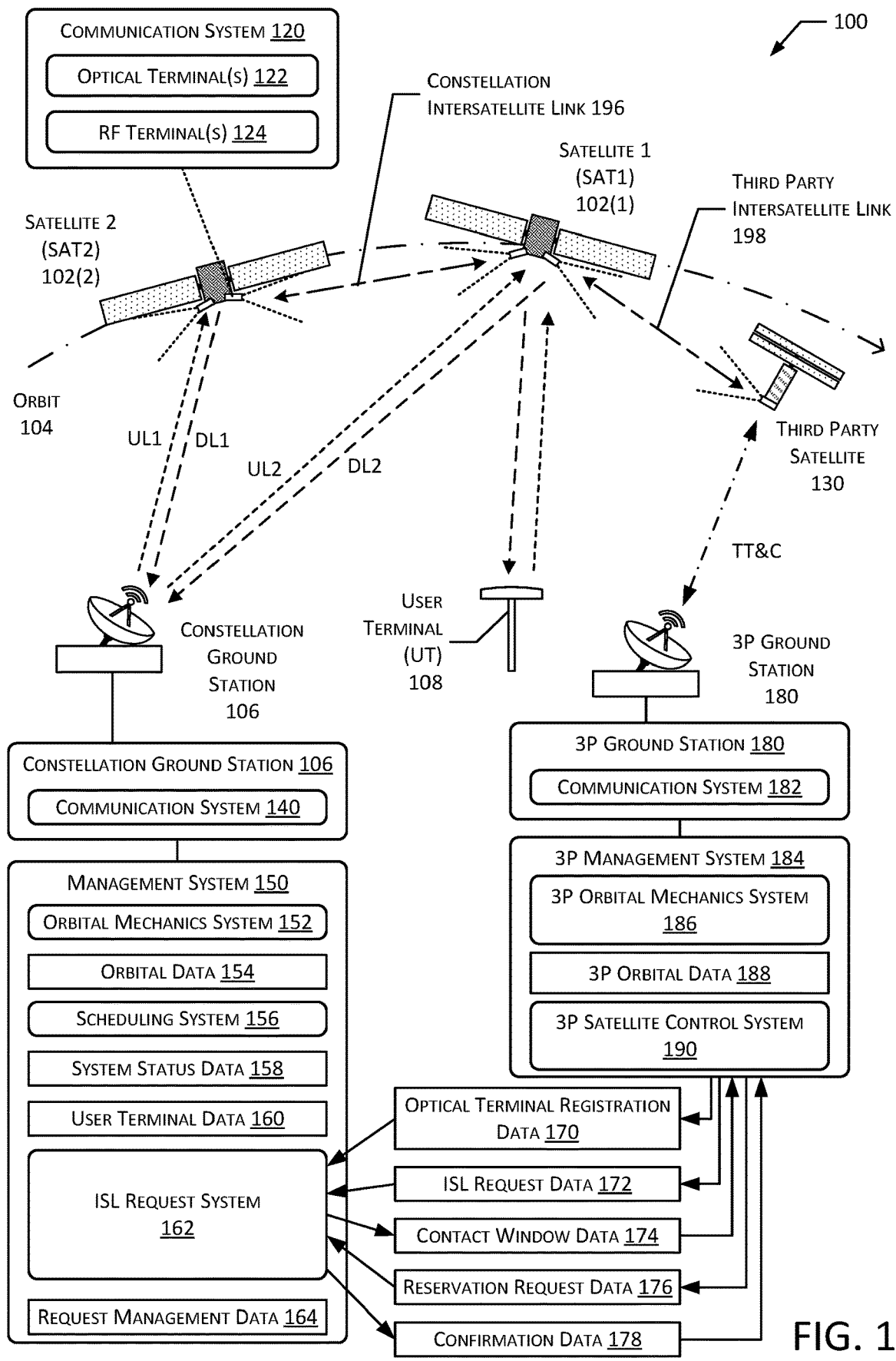
FIG. 1 illustrates a system using ground stations and a constellation of satellites, with at least some satellites capable of providing an intersatellite link (ISL) to a third party satellite, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as optical wavelengths, to send information. Optical wavelengths may include, but are not limited to, infrared wavelengths, visible light wavelengths, ultraviolet wavelengths, and so forth. An optical transceiver comprises a transmitter to send and a receiver to receive signals at optical wavelengths.

Optical wavelengths provide several benefits for data transfer. For example, the high frequencies of optical wavelengths allow high bitrates. Signals at optical wavelengths may be easier to direct in relatively small form factor devices. For example, a telescope may have less volume than a radio-frequency antenna with equivalent gain. Optical wavelengths provide other advantages as well. For example, the same wavelengths may be readily reused simultaneously for communication between different devices, electromagnetic interference from nearby devices may be eliminated, and so forth.

Optical wavelengths may move from one location to another in free space or within a waveguide. Free space may include atmosphere, vacuum, and so forth. In comparison, a waveguide such as an optical fiber may comprise a material such as glass or plastic with an index of refraction such that light at one or more optical wavelengths is propagated within.

A free space optical communication system may be used in a variety of different situations. For example, optical transceivers may be used to provide an intersatellite link (ISL) between a first satellite and a second satellite, allowing data to be sent from the first satellite to another. In another example, a ground station may communicate with a satellite using an optical transceiver. These satellites may be part of the constellation, or may be third-party (3P) satellites that are not affiliated with the constellation. In still another example, fixed terrestrial stations may communicate with one another using optical transceivers.

ISLs may be used to provide high-bandwidth communication services to 3P satellites. This may include transferring data between the 3P satellite and ground, between 3P satellites, and so forth. For example, a 3P satellite that provides remote sensing services may generate terabytes of data every day that then need to be transferred to the ground for further processing. The 3P satellite may use the constellation to quickly transfer this data to the ground. This provides a substantial improvement in the ability of the 3P operator to access that data and may reduce time to deliver information to the 3P operator's 3Ps.

By providing the 3P satellite with access to the constellation, operating costs of the 3P operator may be reduced. For example, the 3P may be able to reduce or eliminate the number of ground stations and their associated costs. Use of the constellation may also provide improved reliability for the 3P operator in transferring data between the 3P satellite and the ground or other satellites.

Participating satellites include a communication system that supports ISLs. These may be optical or RF transceivers. The communication system has a field of regard (FOR) that specifies a solid angle within which communication is possible. With regard to the optical transceiver, the field of regard is the solid angle within which the optical transmitter may emit a signal (such as a laser) and within which incoming light may be acquired (such as with a telescope). In a simple example, an FOR of an optical transceiver may be visualized as a cone with an apex at the optical transceiver and extends out into space. The actual FOR of an optical transceiver may be more complex, due to physical obstructions of the associated satellite structure, actuators, and so forth. For optical communication to take place between two satellites a first FOR of the first satellite is directed towards a second satellite while a second FOR of the second satellite is directed towards the first satellite.

The communication system may include hardware that allows the FOR of an optical transceiver to be pointed within some limit. For example, an optical transceiver may have optics that allow the FOR to be steered by ±5 degrees in yaw and ±7 degrees in pitch, relative to a central axis of the optical system. In another example, the optical transceiver may be gimbaled.

Satellites in non-geostationary orbits (NGSOs) are constantly in motion relative to the Earth. For example, a satellite in low orbit may circle the Earth in 90 minutes, while a satellite in higher orbit may circle the Earth in hours or days. Other effects, such as variations in the Earth's gravitational field, atmospheric drag, and so forth, may also result in changes to the motions. As a result of these and other effects, over time satellites will change their relative positions. For example, relative to a first satellite, a second satellite may appear to move closer and then away.

Satellites in orbit may change their orientation relative to Earth. For example, a communication satellite may keep a particular side pointed at Earth while a space telescope maintains a fixed orientation relative to distant stars.

As a result of these and other factors, the environment of constellation satellites and 3P satellites in orbit is dynamic. To provide an ISL between two satellites, some coordination is required such that the participating satellites are physically close enough and thus in range, oriented such that their FOR are able to view one another, are able to operate on compatible wavelengths and encodings, are unallocated and available to use, and so forth.

Described in this disclosure are techniques and systems that facilitate intersatellite communication. This communication may be between a satellite associated with a constellation and a third-party (3P) satellite. The constellation may provide communication services to a 3P satellite at the request of a 3P operator. An application programming interface (API) associated with the constellation allows an ISL request to be made by a requestor such as a third-party. The ISL request may include various parameters such as desired communication time, bandwidth requested, wavelength(s) used, and so forth. Other information may also be included with the request, such as orbital data of the 3P satellite that includes ephemerides and orientation data.

A management system associated with the constellation may process the ISL request. The management system may determine possible contact windows indicative of time intervals during which an ISL link may be provided to the 3P satellite. In one implementation the contact windows are returned to the 3P requestor for selection. In another implementation the contact windows to be used are determined by the management system. Once the contact windows have been selected, the management system may determine a set of communication parameters indicative of allocated communication resources and a response is returned to the requestor. The response may include information associated with establishment of the ISL, including date, time, location of the constellation satellite at that time, range, range rate, wavelengths, and so forth. The management system then operates the constellation satellites to provide the requested ISL link.

The management system may provide other functions as well. For example, the management system may generate billing records used to bill the 3P operator for use. In another example, the management system may provide the 3P operator with status data about the ISL link.

By using the techniques and systems described in this disclosure, provisioning and usage of intersatellite links is substantially improved. Communication resources may be easily requested and provided even in the dynamic and complex orbital environment. The API allows for inclusion into automated or semi-automated workflows, improving overall efficiency. The system may be used in a variety of applications including, but not limited to communications between a 3P satellite and ground, communications between 3P satellites, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals with various wavelengths, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light in an optical communication system will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area. If that relay station is in orbit, it may be used to relay communications between other satellites that are in orbit, other satellites and a ground station, and so forth.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geostationary orbit at an altitude of 35,800 km may appear to be fixed with respect to the ground because the period of the geostationary orbit matches the rotation of the Earth. In comparison, a satellite in a non-geostationary orbit (NGSO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes. Orbits with different altitudes and other orbital parameters will exhibit various motions in orbit. As a result, satellites in different NGSOs will have different motions, over time moving relative to one another.

NGSO satellites provide various advantages, such as allowing lower latency communications with stations on the Earth, greater spectrum re-use, and so forth. The system 100 shown here comprises a plurality (or "constellation") of satellites 102(1), 102(2), . . . , 102(S), each satellite 102 being in orbit 104. Also shown is a constellation ground station 106, user terminal (UT) 108, a third-party 3P satellite 130, and a 3P ground station 180.

The constellation may comprise hundreds or thousands of satellites 102, in various orbits 104. For example, one or more of these satellites 102 may be in non-geostationary orbits (NGSOs) in which they are in constant motion with respect to the Earth. For example, the orbit 104 is a low Earth orbit (LEO). In this illustration, the orbit 104 is depicted with an arc pointed to the right. A first satellite (SAT1) 102(1) is leading (ahead of) a second satellite (SAT2) 102(2) in the orbit 104. A single orbit 104 is depicted for ease of illustration and not as a limitation. The constellation may use many orbits 104 populated with one or more satellites 102.

The satellite 102 comprises a communication system 120. The communication system 120 may include one or more communication terminals. These communication terminals may include one or more optical terminals (OTs) 122 or radio frequency (RF) terminals 124. The optical terminal 122 uses optical wavelengths such as infrared light, visible light, ultraviolet light, and so forth for communication. The optical terminal 122 comprises an optical transmitter, an optical receiver, and may include one or more actuators to steer or direct a field of regard (FOR) of the optical terminal 122 to a particular direction. This is discussed in more detail with regard to FIG. 3. The RF terminal 124 uses radio frequency wavelengths for communication. The RF terminal 124 comprises an RF transmitter, RF receiver, and may utilize one or more of an electronically steerable phased array antenna or one or more actuators to provide RF gain in a particular direction.

The optical terminal 122 may include an optical receiver and a tracking system. The tracking system provides information about a relative alignment of incoming light. This information may then be used to adjust tracking actuators that direct the incoming light into a desired alignment. For example, the tracking system may determine a distance and direction, relative to a center of a detector array of the optical terminal 122, of the incoming light transmitted by an optical terminal 122(2) from the second satellite 102(2). One or more tracking actuators may be operated responsive to this information to center the incoming light.

One or more constellation ground stations 106 associated with the constellation are in communication with one or more satellites 102 of the constellation. The constellation ground stations 106 may pass data between the satellites 102, a management system 150, networks such as the Internet, and so forth. The constellation ground stations 106 may be emplaced on land, on vehicles, at sea, and so forth. Each constellation ground station 106 may comprise a communication system 140. Each constellation ground station 106 may use the communication system 140 to establish communication with one or more satellites 102, other constellation ground stations 106, and so forth. The constellation ground station 106 may also be connected to one or more communication networks. For example, the constellation ground station 106 may connect to a terrestrial fiber optic communication network. The constellation ground station 106 may act as a network gateway, passing user data or other data between the one or more communication networks and the satellites 102. Such data may be processed by the constellation ground station 106 and communicated via the communication system 140. The communication system 140 of a constellation ground station 106 may include components similar to those of the communication system 120 of a satellite 102 and may perform similar communication functionalities. For example, the communication system 140 may include one or more optical terminals 122. In other implementations, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

With regard to FIG. 1, an uplink is a communication link which allows data to be sent to a satellite 102 from a constellation ground station 106, UT 108, or device other than another satellite 102. Uplinks are designated as UL1, UL2, UL3 and so forth. For example, UL1 is a first uplink from the constellation ground station 106 to the second satellite 102(2). In comparison, a downlink is a communication link which allows data to be sent from the satellite 102 to a constellation ground station 106, UT 108, or device other than another satellite 102. For example, DL1 is a first downlink from the second satellite 102(2) to the constellation ground station 106.

The satellites 102 may also be in communication with one another. For example, the optical terminals 122 may be used to provide an optical constellation intersatellite link (ISL) 196 that provides for communication between satellites 102 in the constellation. The constellation ISL 196 may provide communication between satellites 102 at the same orbital altitude, at other orbital altitudes, and so forth. In some implementations, the uplink(s) and downlink(s) may use radio wavelengths while the constellation ISLs 196 use optical wavelengths. In other implementations, one or more of uplink(s) or downlink(s) may use optical terminals 122.

The satellites 102 of the constellation may also provide communication services to third-party (3P) satellites 130 via a 3P ISL 198. The 3P ISL 198 may comprise an optical ISL. The 3P satellite 130 may include an optical terminal 122 that may be used to communicate with the optical terminal 122 of a satellite 102 in the constellation. The 3P ISL 198 may provide communication between the 3P satellite 130 and constellation satellites 102 at the same orbital altitude, at other orbital altitudes, and so forth.

The constellation ISL 196 allows the satellites 102 to transfer data between one another. This data may include tracking, telemetry, and control data. For example, satellite 102(2) may be out of range of a constellation ground station 106 and sends telemetry data using the constellation ISL 196 to satellite 102(1). Satellite 102(1) then relays the telemetry data to the constellation ground station 106 that in turn sends the telemetry data to the management system 150. For example, if constellation ground station 106(1) is unavailable to handle downlink traffic from satellite 102(1), then satellite 102(1) may use the constellation ISL 196 to send data to satellite 102(2) that is in communication with constellation ground station 106(2). In another example, data from a first UT 108(1) that is addressed to a second UT 108(2) may be sent from the first satellite 102(1) to the satellite 102(X) that is providing service to the second UT 108(2) using the constellation ISL 196.

Likewise, the 3P ISL 198 allows the 3P satellite 130 to use the constellation to transfer data with other 3P satellites 130 or with a 3P ground station 180. For example, the 3P ISL 198 may be used by the 3P satellite 130 to send terabytes of environmental remote sensing data that has been acquired to the 3P's servers for further processing. In another example, the 3P ISL 198 may be used to transfer tracking, telemetry, and control data between the 3P satellite 130 and a 3P management system 184.

In some circumstances, a 3P may operate one or more 3P ground station(s) 180. The 3P ground station 180 may be used to send and receive tracking, telemetry, and control data with the 3P satellite(s) 130. While a single 3P satellite 130 is depicted, in some implementations a 3P may operate a second constellation comprising two or more 3P satellites 130.

The 3P ground station 180 may comprise a communication system 182 that may be similar to the communication system 140 employed by the constellation ground station 106. The communication system 182 of the 3P ground station 180 may differ in terms of functions provided, frequencies used, modulation and coding supported, and so forth. For example, the 3P ground station 180 may be engineered to communicate with the 3P satellite 130 and not the satellites 102 of the constellation.

Due to various reasons, a 3P operator may maintain or utilize a relatively small number of 3P ground stations 180. Given the dynamics of a NGSO and motion of the 3P satellite 130, the 3P satellite 130 may not be within communication range of the 3P ground station 180 for long. This brief window of time may be insufficient or may not be convenient for transferring large quantities of data. For example, the 3P satellite 130 may only be within communication range of the 3P ground station 180 for seven minutes out of every orbit, and may not be visible during every orbit. This may be insufficient time for the 3P satellite 130 to send a large quantity of data via the 3P ground station 180. This scenario is one in which the 3P satellite 130 may utilize the constellation and the 3P ISL 198 to transmit that large quantity of data. The use of the constellation and the 3P ISL 198 also allows greater flexibility, such as allowing the 3P satellite 130 to downlink data, regardless of whether it is in range of the 3P ground station 180, when a constellation satellite 102 is available. Provisioning of the 3P ISL 198 is discussed in more detail with regard to the ISL request system 162.

In other implementations, the ground stations may be shared or reconfigurable, and may provide services to the constellation satellites 102 and the 3P satellites 130.

The constellation ground stations 106 associated with the constellation are in communication with a management system 150. The management system 150 is also in communication, via the constellation ground stations 106, with the satellites 102 and the UTs 108. The management system 150 coordinates operation of the satellites 102, constellation ground stations 106, UTs 108, scheduling communication services for 3P satellites 130, and manages other resources of the system 100. The management system 150 may comprise one or more of an orbital mechanics system 152, a scheduling system 156, or an inter-satellite link (ISL) request system 162.

The orbital mechanics system 152 determines orbital data 154 that is indicative of a state of a particular satellite 102 at a specified time. The orbital data 152 may comprise one or more of ephemerides data or orientation data associated with a particular satellite 102. In one implementation, the orbital mechanics system 152 may use the orbital data 154 to predict a location, velocity, orientation, and so forth of particular satellites 102 at particular times or time intervals. In some implementations, the orbital mechanics system 152 may use data obtained from actual observations of the satellites 102 by tracking stations, data from the satellites 102, scheduled maneuvers, and so forth to determine the orbital data 154. The orbital mechanics system 152 may also consider other data, such as space weather, conjunction mitigation, orbital elements of known debris, and so forth.

The scheduling system 156 schedules resources to provide communication between parts of the network such as the satellites 102 and the constellation ground stations 106. The scheduling system 156 may also schedule resources associated with providing communication services to users of the constellation, such as the UTs 108 and 3P satellites 130. For example, the scheduling system 156 may determine handover data that indicates when communication is to be transferred from the first satellite 102(1) to the second satellite 102(2). Continuing the example, the scheduling system 156 may also specify parameters such as frequency, timeslot, and so forth. During operation, the scheduling system 156 may use information such as the orbital data 154, system status data 158, user terminal data 160, request management data 164, and so forth.

The system status data 158 may comprise information such as which UTs 108 are currently transferring data, satellite availability, current satellites 102 in use by respective UTs 108, capacity available at particular constellation ground stations 106, available interconnections between satellites 102 provided by constellation ISLs 196, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The ISL request system 162 provides third-party (3P) operators that are outside of the constellation with a mechanism to request a 3P ISL 198 to provide communication services to a 3P satellite 130. In one implementation the ISL request system 162 may utilize an application programming interface (API). During operation, the ISL request system 162 may utilize request management data 164. For example, the request management data 164 may store information about pending requests, cached contact window data, and so forth. The ISL request system 162 may communicate with one or more of the orbital mechanics system 152, the scheduling system 156, and may also communicate with other external or 3P systems, such as the 3P orbital mechanics system 186. Operation of the ISL request system 162 is discussed in more detail below.

The 3P ground station 180 associated with the 3P satellite 130 is in communication with a 3P management system 184. The 3P management system 184 may also be communication, via the constellation and 3P ISL 198, with the 3P satellite 130. The 3P management system 184 operates the 3P satellite 130. The 3P management system 184 may comprise one or more of a 3P orbital mechanics system 186 or a 3P satellite control system 190.

The 3P orbital mechanics system 186 determines 3P orbital data 188 that is indicative of a state of a particular 3P satellite 130 at a specified time. The 3P orbital data 188 may comprise one or more of ephemerides data or orientation data associated with a particular 3P satellite 130. In one implementation, the 3P orbital mechanics system 186 may use the 3P orbital data 188 to predict a location, velocity, orientation, and so forth of a particular 3P satellite 130 at particular times or time intervals. In some implementations, the 3P orbital mechanics system 186 may use data obtained from actual observations of the 3P satellite 130 by tracking stations, sensor data from the 3P satellite 130, scheduled maneuvers, and so forth to determine the 3P orbital data 188. The 3P orbital mechanics system 186 may also consider other data, such as space weather, conjunction mitigation, orbital elements of known debris, and so forth.

The 3P satellite control system 190 may process telemetry data from the 3P satellite 130, may send commands to the 3P satellite 130, operate the 3P satellite 130, and so forth. For example, the 3P satellite control system 190 may send instructions to operate onboard sensors to acquire sensor data, and then operate a 3P OT 122 onboard the 3P satellite 130 to send that data via a 3P ISL 198 to the ground for processing. The 3P satellite control system 190 may use the ISL request system 162 to request a 3P ISL 198.

During initial setup, the OT 122 associated with the 3P satellite 130 is registered with the management system 150 of the constellation. The 3P management system 184 may send optical terminal (OT) registration data 170 to the ISL request system 162.

The ISL request system 162 may receive and store the OT registration data 170. The OT registration data 170 may comprise information about the OT 122 associated with the 3P satellite 130. In one implementation the OT registration data 170 may comprise one or more of the parameters described with regard to Table 1.

TABLE 1

| Parameter | Description |
| --- | --- |
| 3P Satellite ID | Identifies the 3P satellite that hosts this optical terminal. |
| Wavelength Compatibility | Wavelength compatibility data indicates the wavelengths that the 3P optical terminal capabilities utilizes during operation. |
| Network Entry Method | Network entry method data that the 3P provides to their satellite to facilitate network entry for this contact. (E.g., cryptographic keys.) |
| Field of Regard Reference Azimuth Vector | A vector that represents the 3P optical terminal's azimuth rotation axis when the azimuth and elevation angles are both "zero". |
| Field of Regard Reference Elevation Vector | A vector that represents the 3P optical terminal's elevation rotation axis when the azimuth and elevation angles are both "zero". |
| Field of Regard Polygon Vertices (radians) | A set of spherical coordinates that describes the field of regard polygon for the optical terminal, relative to the coordinate system defined by the FOR reference azimuth vector and the FOR reference elevation vector. |
| Maximum Azimuth Rotation Rate (radians/sec) | The maximum rate at which the 3P optical terminal is able to rotate about the azimuth axis. |
| Maximum Elevation Rotation Rate (radians/sec) | The maximum rate at which the 3P optical terminal is able to rotate about the elevation axis. |

TABLE 1-continued

| Parameter | Description |
| --- | --- |
| Sun Exclusion Angle (radians) | The minimum angle between a boresight of the 3P OT and sun angle that the 3P optical terminal is able to operate with. |

In other implementations, such as when an RF terminal 124 is used to provide the 3P ISL 198, the registration data may comprise data associated with the RF terminal 124. For example, frequencies to use, antenna beamwidth, and so forth.

Responsive to registration, the ISL request system 162 may return a 3P OT identifier (ID) (not shown). The 3P OT ID is indicative of a particular 3P OT 122. Each 3P OT ID is associated with a 3P satellite identifier (ID) that is indicative of a particular 3P satellite 130. A single 3P satellite 130 may have one or more 3P OTs 122. As a result, a single 3P satellite ID may be associated with one or more 3P OT IDs. The 3P OT ID may be used in subsequent communications between the ISL request system 162 and the 3P management system 184.

In another implementation, the OT registration data 170 may include the 3P OT ID. For example, the 3P management system 184 may assign the 3P OT ID.

Once a 3P OT 122 has been registered, the ISL request system 162 may process requests for one or more 3P ISLs 198 that utilize the 3P OT 122. The 3P management system 184 may send ISL request data 172. The ISL request data 172 comprises information that is associated with provisioning a 3P ISL 198. Depending upon the operating mode in use by the ISL request system 162, or specified by the ISL request data 172, the ISL request data 172 may include different parameters. For example, the ISL request system 162 may operate in one or more of a simple multi-window mode, an advanced multi-window mode, a simple flexible mode, or advanced flexible mode, or combinations thereof. Different modes may utilize different information as input and may provide different output, as described in the following.

Responsive to the ISL request data 172, the ISL request system 162 determines contact window data 174. A contact window is an interval of time during which a particular constellation OT 122 of a satellite 102 of the constellation may be able to establish communication with a 3P OT 122 of the 3P satellite 130. In one implementation, the ISL request system 162 may determine a set of cached contact window data before receiving the ISL request data 172. One or more contact windows indicated by the set of contact window data may be selected from the set of cached contact window data and returned to the 3P management system 184 as contact window data 174.

The 3P management system 184 may receive the contact window data 174 and determine if one or more of the contact windows specified therein are deemed to be suitable for use. Based on this determination, the 3P management system 184 may send reservation request data 176 to the ISL request system 162. The reservation request data 176 may specify one or more of the contact windows indicated in the contact window data 174. The reservation request data 176 may also include other information, such as link management data, cryptographic keys, and so forth to be used by the constellation OT 122 to facilitate establishment of the 3P ISL 198.

The ISL request system 162 may receive the reservation request data 176, and based on the reservation request data 176, determines confirmation data 178. The confirmation data 178 may comprise information that confirms the reservation sought, and may include other information such as link management data, cryptographic keys, and so forth to be used by the 3P OT 122 to facilitate establishment of the 3P ISL 198. The confirmation data 178 is sent to the 3P management system 184.

The 3P management system 184, responsive to the confirmation data 178, may proceed to operate the 3P OT 122. For example, the 3P satellite control system 190 may send commands to the 3P satellite 130 that operate the 3P OT 122 at a particular time to point its FOR in a particular direction (such as toward the constellation satellite 102), transmit a tracking signal at a first specified wavelength, and receive a tracking signal at a second specified wavelength.

After sending the confirmation data 178, the ISL request system 162 or other systems may perform additional checks before and after establishment of the 3P ISL 198. For example, the systems may exchange orbital data before establishment of the 3P ISL 198. In the event the updated orbital data indicates that a satellite will not be in a suitable position for the 3P ISL 198, cancellation data may be sent to the other system. In another example, if one or more of the constellation satellite 102, constellation OT 122, 3P satellite 130, or 3P OT 122 are deemed to be inoperable or otherwise unavailable for use, cancellation data may be sent to the other system. Responsive to the cancellation data, the previously reserved ISL resources that were associated with the confirmation data 178 may be released for use.

The ISL request system 162, responsive to the reservation request data 176, may proceed to operate the constellation OT 122. For example, the scheduling system 156 may send commands to the constellation satellite 102(2) that operate the constellation OT 122 at a particular time to point its FOR in a particular direction (such as toward the 3P satellite 130), transmit a tracking signal at the second specified wavelength, and receive a tracking signal at the first specified wavelength.

Figure 2:
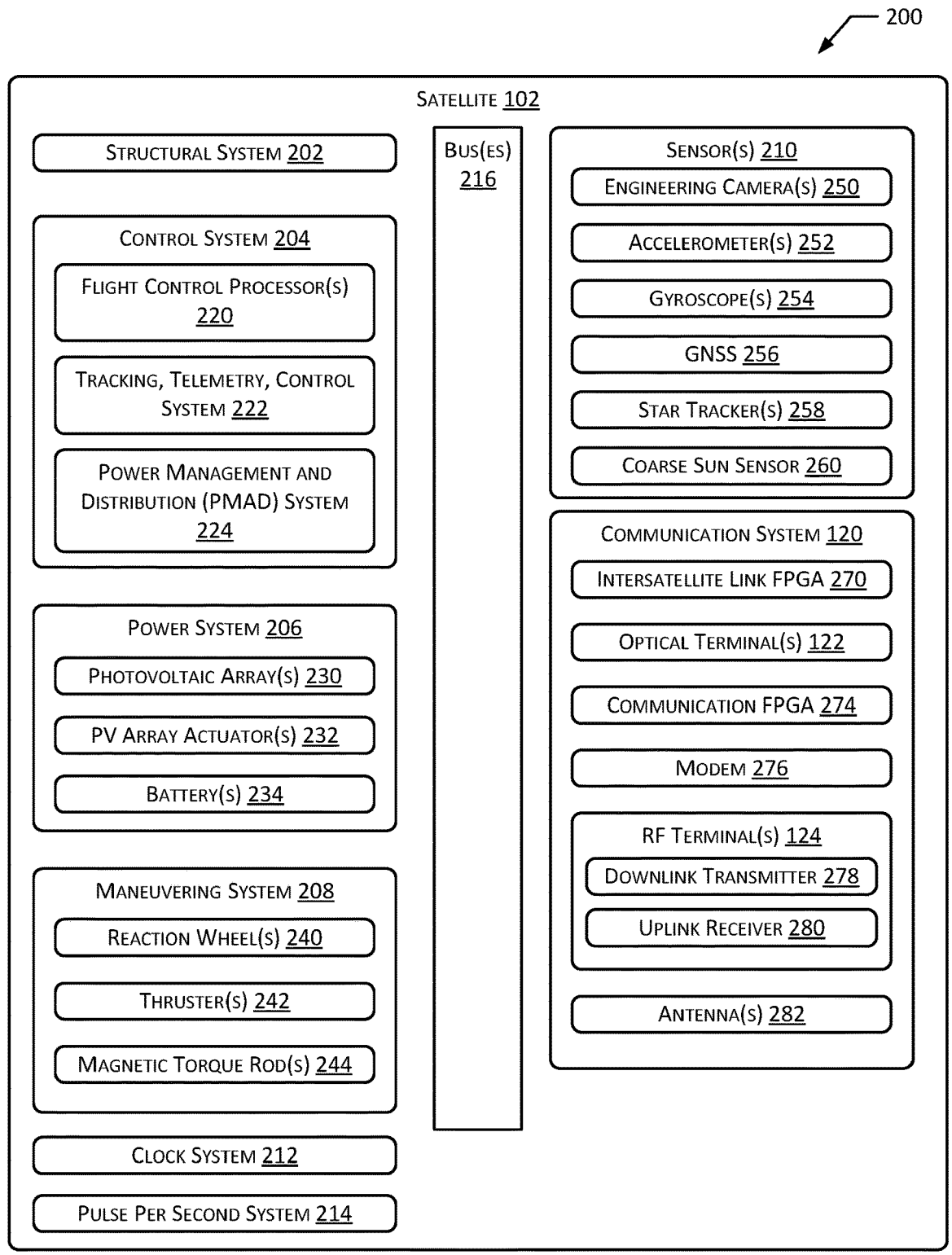
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 120.

A clock system 212 may comprise one or more devices that provide precision time data. For example, the clock system 212 may comprise one or more local high precision clocks. For example, the local clock may comprise one or more of an atomic clock, quantum clock, optical lattice clock, and so forth. The clock system 212 may maintain synchronization with an external reference. For example, the clock system 212 may maintain synchronization with true time originating from one or more stratum 0 reference clocks, such as maintained by a country or standards organization. For example, the clock system 212 may be ultimately synchronized to global positioning system (GPS) time as provided by the Global Positioning System, UTC from the National Institute of Standards and Technology (NIST), and so forth.

In some implementations the clock system 212 may be used to provide position, navigation, or timing (PNT) services. For example, the clock system 212 may provide time data that is then used by the communication system 120 to transmit a pseudorandom code and time of transmission messages, ephemeris or almanac data about the satellite 102, and so forth. Based on this information from one or more satellites 102, a UT 108 may determine its position, provide navigation functions, derive time data associated with the reference clocks, and so forth.

In some implementations output from the clock system 212 may be used to operate the communication system 120 or other systems. For example, the clock system 212 may provide time information to a pulse per second (PPS) system 214. The PPS system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations, the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, active cooling devices, and so forth.

The control system 204 provides various services, such as operating the onboard systems, resource management, providing telemetry, processing commands, and so forth. For example, the control system 204 may direct operation of the communication system 120. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a constellation ground station 106, send telemetry to the constellation ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more photovoltaic (PV) array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters may expend propellant. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230 or other portion of the satellite 102. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 120 provides communication with one or more other devices, such as other satellites 102, constellation ground stations 106, user terminals 108, and so forth. The communication system 120 may include one or more modems 276, digital signal processors, power amplifiers, antennas 282 (including at least one antenna that implements multiple antenna elements, such as a phased array antenna), lasers, telescopes, photodetectors, processors, memories, storage devices, communications peripherals, interface buses, and so forth. Such components support communications with other satellites 102, constellation ground stations 106, user terminals 108, and so forth using various wavelengths. The communications may involve multiplexing, encoding, and compressing data to be transmitted, modulating the data to a desired frequency, and amplifying it for transmission. The communications may also involve demodulating received signals and performing any necessary de-multiplexing, decoding, decompressing, error correction, and formatting of the signals. Data decoded by the communication system 120 may be output to other systems, such as to the control system 204, for further processing. Output from a system, such as the control system 204, may be provided to the communication system 120 for transmission.

The communication system 120 may include hardware to support the constellation ISL 196. For example, an intersatellite link FPGA 270 may be used to modulate data that is sent and received by an optical terminal 122 to send data between satellites 102. The optical terminal 122 may operate using optical wavelengths.

The communication system 120 may use the optical terminals 122 to transfer link management data. The link management data may comprise information about frequencies, wavelength, modulation, coding, relative motion, signal strength, doppler shift, and so forth. The link management data may be used by a receiving device to establish and maintain tracking, to coordinate changes in modulation or coding, and so forth.

A communication FPGA 274 may be used to facilitate communication between the satellite 102 and the constellation ground stations 106, UTs 108, and so forth. For example, the communication FPGA 274 may direct operation of a modem 276 to modulate signals sent using a downlink transmitter 278 and demodulate signals received using an uplink receiver 280. The downlink transmitter(s) 278 and uplink receiver(s) 280 may be implemented as a transceiver. The transceiver may be connected to one or more antennas 282. The satellite 102 may include one or more antennas 282. For example, one or more parabolic antennas may be used to provide communication between the satellite 102 and one or more constellation ground stations 106. In another example, a phased array antenna may be used to provide communication between the satellite 102 and the UTs 108.

The phased array antenna contains many elements and uses slight differences in timing or phase of the signals to produce a beamforming effect that directs a signal to transmit or receive in a particular direction relative to the phased array antenna. For example, a phased array antenna system may include antenna control electronics controlling a radio frequency (RF) feeding network. The RF feeding network may include a plurality of signal conditioning components interposed between antenna elements and the transceivers. The signal conditioning components introduce one or more of a phase modulation or an amplitude modulation to the signal sent to the antenna elements. This introduces a progressive phase modulation and produces interference in the individual transmission of each antenna element, producing directivity or gain in a particular direction. The phase modulation imposed on each antenna element will differ and will be dependent on a spatial location of a communication target that determines an optimum beam vector (e.g., where the beam vector is found by one or more of maximizing signal intensity or connection strength). The optimum beam vector may change with time, such as when a communication target moves relative to the phased array antenna system.

Figure 3:
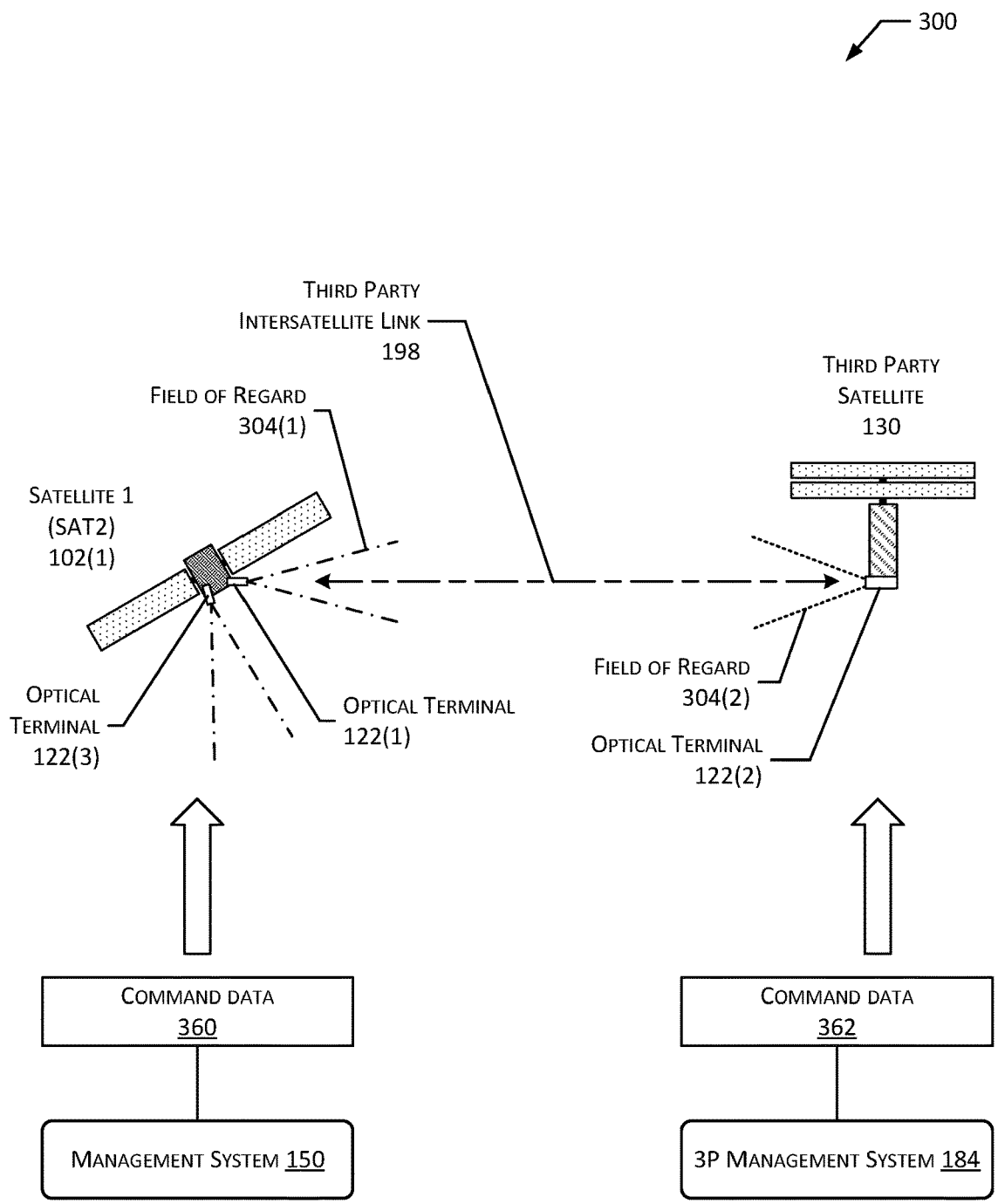
FIG. 3 illustrates the ISL with a third-party satellite, according to some implementations.

FIG. 3 illustrates at 300 the 3P ISL 198 with a 3P satellite 130, according to some implementations.

The optical terminals 122 have a field of regard (FOR) 304. For example, the FOR 304 may be determined based on the focal length of an optical system such as a telescope. For example the FOR 304 describes a solid angle within which incoming light will be acquired and directed to various parts of the optical terminal 122. The FOR 304 may also be affected by other factors, such as the presence of physical obstructions of the associated satellite structure, actuator placement and motions, and so forth.

In some implementations, the optical terminals 122 may have an FOR 304 that is fixed, relative to the structure of the respective satellite 102. In other implementations, the optical terminals 122 may have an FOR 304 that can be pointed or redirected. One or more actuators may be used to change the direction of the FOR 304. The optical terminals 122 may be mounted on a moveable mount, such as a gimbal. The moveable mount may move the optical terminal 122 along one or more axes. Instead of, or in addition to the moveable mount, one or more actuators within the optical terminal 122 may change one or more of an azimuth or elevation of the FOR 304.

For communication to take place, the FOR 304 of the respective endpoints of the communication link need to be directed towards one another. For example, as shown here the OT 122(1) with an FOR 304(1) of the constellation satellite 102(1) is directed towards the 3P satellite 130. Continuing the example, the OT 122(2) with an FOR 304(2) of the 3P satellite 130 is directed towards the constellation satellite 102(1).

As described, each OT 122 may have a unique OT ID. Each constellation satellite 102 may include a plurality of OTs 122. Each 3P satellite 130 may include a plurality of OTs 122.

The management system 150 sends command data 360 to the satellite 102(1). The satellite 102(1) may execute the command data 360 to operate the OT 122(1) to establish the 3P ISL 198. For example, the command data 360 may comprise instructions to operate one or more actuators to direct the FOR 304(1) in a specified direction at a specified time, operate an optical transmitter, operate an optical receiver, and so forth. In some implementations the command data 360 may operate other systems as well. For example, the command data 360 may operate the maneuvering system 208 of the constellation satellite 102.

The 3P management system 184 sends command data 362 to the 3P satellite 130. The 3P satellite 130 may execute the command data 362 to operate the OT 122(2) to establish the 3P ISL 198. For example, the command data 362 may comprise instructions to operate one or more actuators to direct the FOR 304(2) in a specified direction at a specified time, operate an optical transmitter, operate an optical receiver, and so forth. In some implementations the command data 362 may operate other systems as well. For example, the command data 362 may operate a maneuvering system of the 3P satellite 130.

Figure 4:
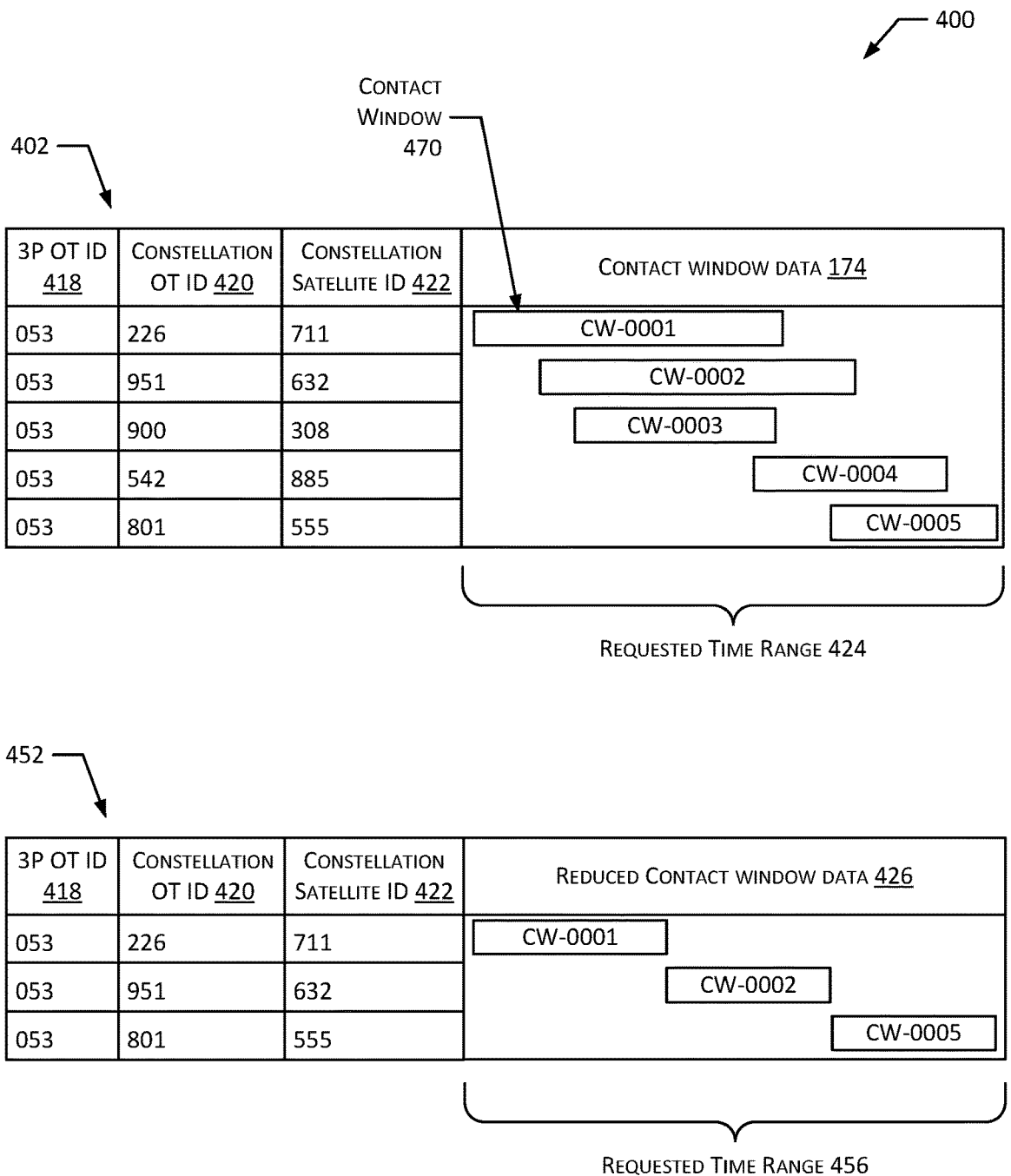
FIGS. 4-5 illustrate contact window options to provide a third-party ISL satellite link, according to some implementations.
Figure 5:
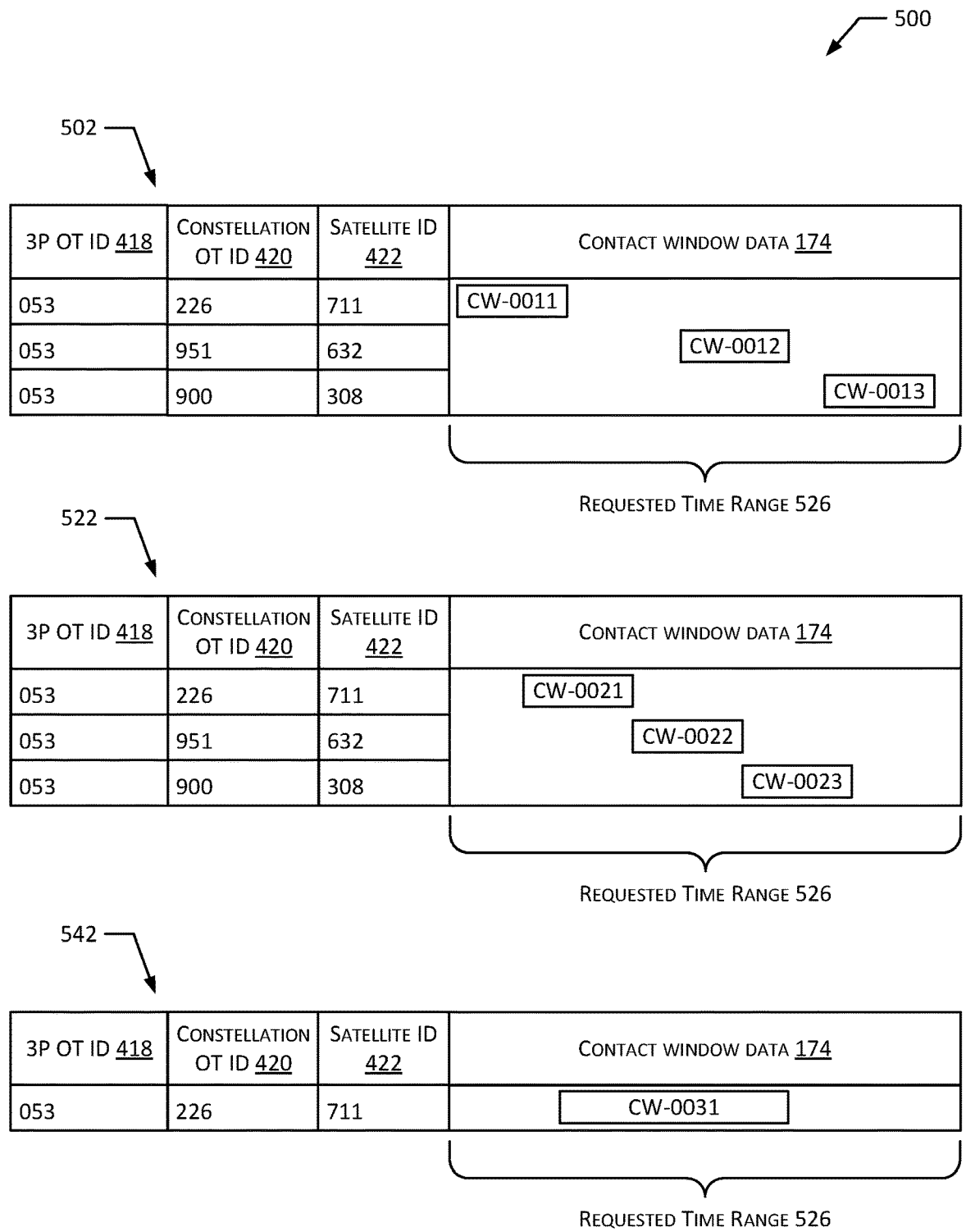

FIGS. 4-5 illustrate at 400 and 500 contact window options to provide a third-party ISL 198, according to some implementations. In one implementation, a contact window comprises a time interval during which a 3P ISL 198 may be established between a constellation satellite 102 and a 3P satellite 130. Depending upon the operating mode used by the ISL request system 162, the contact window may be determined based on different considerations. The operating mode may be set by default, or may be specified, such as by data included in the ISL request data 172. These modes are discussed in more detail below with regard to FIG. 7.

A 3P OT ID 418 is indicative of a particular 3P OT 122.

A constellation OT ID 420 is indicative of a particular constellation OT 122.

A constellation satellite ID 422 is indicative of a particular constellation satellite 102.

A set of possible contact windows 470 are depicted within a requested time range 424. A contact window 470 extends from a first time to a second time.

At 402 a graph depicts contact window data 174 comprising a plurality of contact windows 470. Each contact window 470 is associated with a particular combination of 3P OT ID 418 and constellation OT ID 420 and specifies a particular time interval. Some of the contact windows 470 may overlap in time. For example, part of "CW-0001" overlaps "CW-0002". The contact window data 174 may be determined by the ISL request system 162 and provided to the 3P management system 184.

At 452 a graph depicts reduced contact window data 426. The reduced contact window data 426 may be based on the contact window data 174, such as shown in the graph 402. For example, the 3P management system 184 may accept the contact window data 174 as input and determine reservation request data 176 that is indicative of the set of reduced contact windows.

As shown at 452, the reduced contact window data 426 comprises contact windows that are subsets of the contact window data 174 shown at 402. The time interval of the respective intervals selected for use have been adjusted to provide contiguous but non-overlapping coverage across three contact windows that have approximately the same duration. For example, as CW-0001 ends, CW-0002 begins, and as CW-0002 ends, CW-0005 begins. The start and end times of CW-0001 and CW-0002 have been modified with respect to those presented at 402. The 3P management system 184 may determine a start or end time of a particular contact window that is within the time interval specified by the contact window data 174. In this illustration, the 3P management system 184 determined that CW-0003 and CW-0004 would not be used.

The reservation request data 176 returned to the ISL request system 162 may include the reduced contact window data 426. Continuing the example shown, the reservation request data 176 may specify the three contact windows and their start and end times as modified by the 3P management system 184.

In some implementations one or more of the ISL request system 162 or the 3P management system 184 may enforce various limits with regard to windows. For example, a minimum contact window duration may be specified and enforced. The minimum contact window duration may be enforced to minimize link setup and teardown operations by the OTs 122, or for other reasons.

In another implementation, as discussed below, the ISL request system 162 may determine the reduced contact window data 426. In this implementation, the contact window data 174 may comprise the reduced contact window data 426 that is then sent to the 3P management system 184. The 3P management system 184 may then return reservation request data 176 that accepts or declines the proposed reduced contact windows 470. In yet another implementation, the 3P management system 184 may modify the proposed reduced contact windows 470 and return that information as the reservation request data 176.

FIG. 5 depicts additional graphs of contact window data 174 that may be provided by the ISL request system 162. The ISL request data 172 or other configuration data may specify constraints, if any, to be used in determining the contact window data 174.

At 502 a graph depicts contact window data 174 that has been determined without contact window constraints. For example, three contact windows CW-0011, CW-0012, and CW-0013 are shown. There are gaps of time between these contact windows.

At 522 a graph depicts contact window data 174 that has been determined with the constraint that contact windows must be contiguous or adjacent in time. For example, three contact windows CW-0021, CW-0022, and CW-0023 are shown. The contact windows are contiguous in that CW-0022 begins at the end of CW-0021, and CW-0023 begins at the end of CW-0022.

At 542 a graph depicts contact window data 174 that has been determined with the constraint of a single contact window. For example, a single contact window CW-0031 is shown.

In other implementations, other constraints may be specified. For example, a constraint may require overlapping time windows. Overlapping time windows and the use of a plurality of OTs 122 may allow for "make before break"

connections in which a second 3P ISL 198 is established using a second contact window before discontinuing a first 3P ISL 198 that uses a first contact window.

Figure 6:
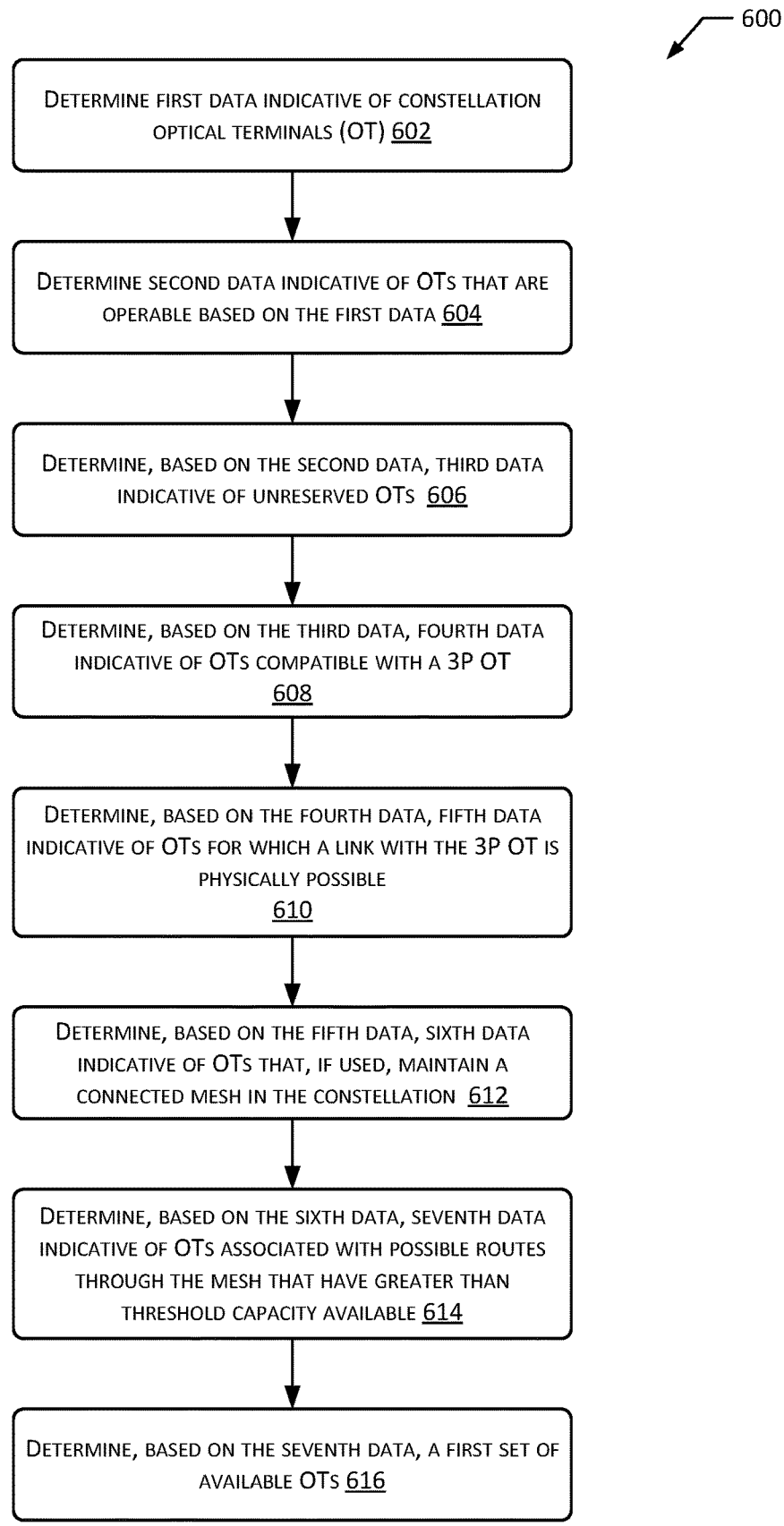
FIG. 6 is a flow diagram of a process to determine a set of available OTs, according to some implementations.

FIG. 6 is a flow diagram of a process 600 to determine a set of available OTs 122, according to some implementations. The process may be implemented at least in part by one or more of the management system 150 or other devices. The process may be performed for a particular time or time interval. The process may be performed on a scheduled basis, upon demand such as on receipt of ISL request data 172, or both. In some implementations one or more of the operations depicted may be omitted.

At 602 first data is determined that is indicative of constellation OTs 122. For example, the first data may comprise a listing of all OTs 122 on all constellation satellites 102.

At 604 second data is determined, based on the first data, that is indicative of constellation OTs 122 that are operable, also known as "in service". Constellation OTs 122 that are operable may comprise those OTs 122 that are in working condition and able to be used. For example, the second data may omit those constellation OTs 122 that are inoperable due to damage or other malfunction.

At 606 third data is determined, based on the second data, that is indicative of unreserved constellation OTs 122. As described above, after receipt of the reservation request data 176, the ISL request system 162 may reserve a particular constellation OT 122 for a specified time window. A constellation OT 122 may also be reserved for use by the constellation, such as to provide a constellation intersatellite link 196. Unreserved constellation OTs 122 are those constellation OTs 122 that have not been reserved for a specified time window. For example, the third data may omit those constellation OTs 122 that are allocated for use. This may include allocation for use by the constellation, by a 3P, or both.

At 608 fourth data is determined, based on the third data, that is indicative of constellation OTs 122 that are compatible with the 3P OT 122. Compatibility may be determined based on transmit wavelength(s), receive wavelength(s), signal modulation technique, signal coding used, and so forth. For example, for the 3P ISL 198 to be established, the constellation OT 122 and the 3P OT 122 may each be required to transmit wavelengths of light that are detectable by the other.

At 610 fifth data is determined, based on the fourth data, that is indicative of constellation OTs 122 for which a 3P ISL 198 with the 3P OT 122 is physically possible. The determination as to whether a link is possible may be based on a variety of factors. These may include, but are not limited to: range, range rate, orientation of the constellation satellite 102 hosting the constellation OT 122, range of movement available for the FOR 304 of the constellation OT 122, possible obstructions introduced by the constellation satellite 102 structure, obstruction due to the Earth, orientation of the 3P satellite 130 hosting the 3P OT 122, range of movement available for the FOR 304 of the 3P OT 122, possible obstructions introduced by the 3P satellite 130 structure, and so forth.

In some implementations this operation may be omitted or may be performed by another system. For example, the 3P management system 184 may make this determination as to whether a link is physically possible with a specified constellation OT 122.

In some implementations this operation may be performed at another time. For example, the operation of 610 may be performed after receipt of ISL request data 172 that is indicative of particular 3P OTs 122.

At 612 sixth data is determined, based on the fifth data, that is indicative of constellation OTs 122 that, if used, maintain a connected mesh within the constellation. It may be desirable to maintain a connected mesh network to facilitate data transfer across the constellation. In some implementations the constellation satellite 102 may have a limited number of OTs 122. A determination may be made as to whether to use the constellation OT 122 to maintain connection with other constellation OTs 122 and maintain a mesh network, or not. For example, a constellation satellite 102 may have four constellation OTs 122 onboard. The constellation satellite 102 may use two or three of these constellation OTs 122 to maintain a mesh network, connecting with two or three other constellation OTs 122 hosted by other constellation satellites 102. This would leave the unused constellation OTs 122 available for providing 3P ISLs 198.

At 614 seventh data is determined, based on the sixth data, that is indicative of constellation OTs 122 associated with possible routes through the connected mesh that have greater than a threshold capacity available. A route may comprise a set of one or more constellation ISLs 196, downlinks to constellation ground station(s) 106, and so forth. The determination at 614 may be performed to attempt to provide a 3P ISL 198 that will have sufficient capacity along the associated route to deliver data.

At 616 a first set of available constellation OTs 122 is determined, based on the seventh data. This first set of available constellation OTs 122 may then be subsequently used to determine contact window data 174, as described with regard to FIG. 7.

Figure 7:
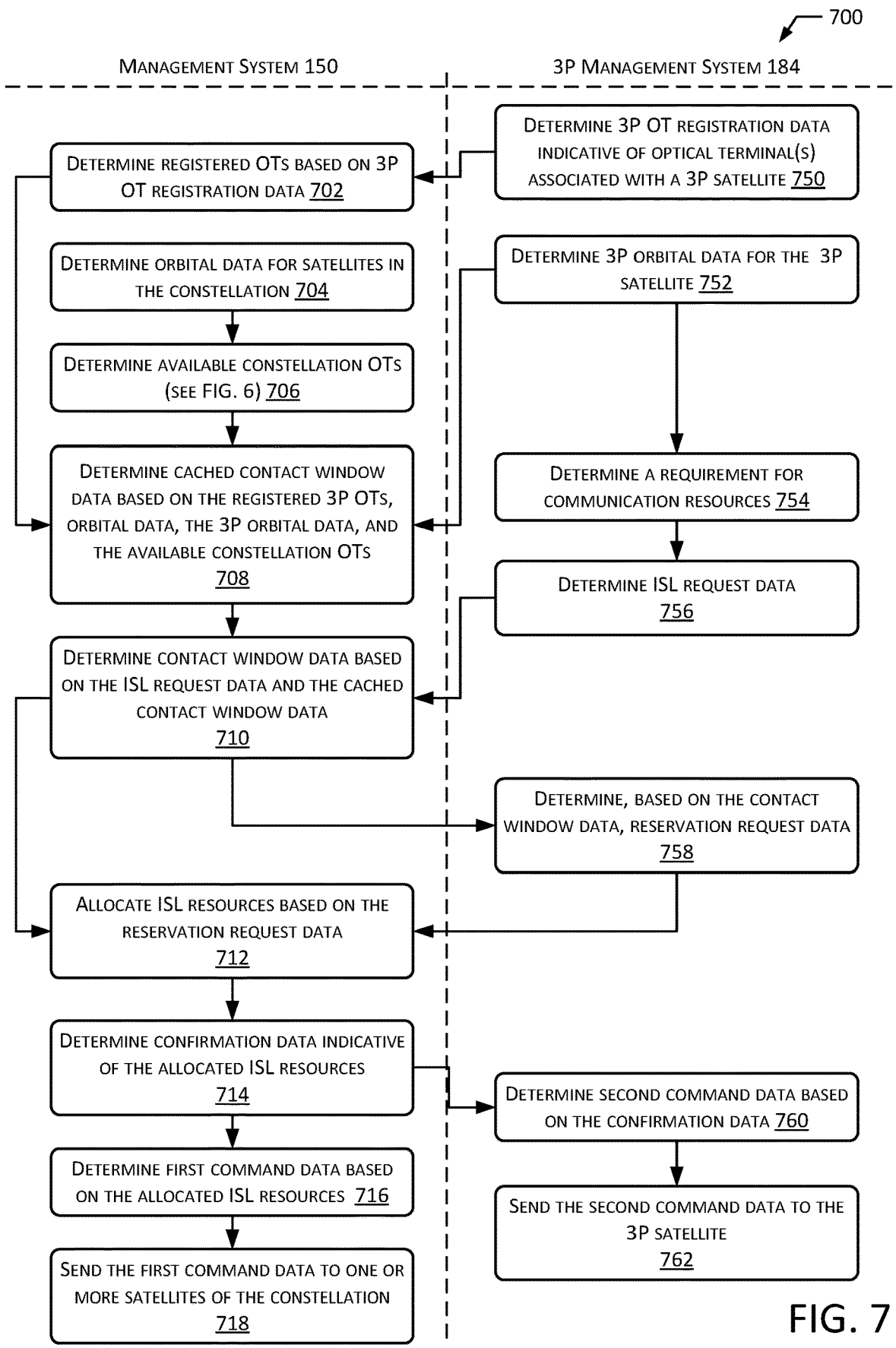
FIG. 7 is a flow diagram of a process to provide an ISL to a third-party satellite, according to some implementations.

FIG. 7 is a flow diagram 700 of a process to provide a 3P ISL 198 to a 3P satellite 130, according to some implementations. The process may be implemented at least in part by one or more of the management system 150, the 3P management system 184, the constellation satellite 102, the 3P satellite 130, or other devices. In this figure, operations performed by the management system 150 are depicted in the left-hand column while operations performed by the 3P management system 184 are depicted in the right-hand column. In some implementations, one or more operations may be performed by a different system.

In some implementations the management system 150 may include, or be in communication with the ISL request system 162. The ISL request system 162 may perform one or more of the following operations that are associated with the management system 150. The ISL request system 162 may implement an application programming interface (API) to perform or otherwise be associated with the following operations. For example, the API may implement "methods" or requests that when sent to the ISL request system 162 may result in a response.

At 750 3P OT registration data 170 is determined by the 3P management system 184 and is sent to the management system 150. The 3P OT registration data 170 is indicative of one or more characteristics associated with a 3P OT 122 that is associated with a 3P satellite 130. For example, the 3P OT registration data 170 may comprise one or more of the parameters described with regard to TABLE 1.

At 702 the management system 150 determines registered OTs 122 based on the 3P OT registration data 170. The management system 150 may also determine registered constellation OTs 122. For example, during provisioning of constellation satellites 102, the hosted constellation OTs 122 may be registered.

At 752 the 3P management system 184 determines 3P orbital data 188 for the 3P satellite 130. The 3P orbital data 188 may be sent to the management system 150. For example, the 3P management system 184 may send data comprising one or more of the parameters shown with regard to TABLE 2.

TABLE 2

| Parameter | Description |
| --- | --- |
| 3P Satellite ID | Identifies the 3P satellite associated with this request. |
| 3P Satellite Ephemerides | 3P Satellite state vectors. |

A single instance of sending the 3P orbital data 188 is depicted in this figure for ease of illustration, and not as a limitation. During operation of the system, the 3P management system 184 may send updates of the 3P orbital data 188 on a regular schedule, responsive to a maneuver of the 3P satellite 130, upon request by the management system 150, and so forth.

At 704 the management system 150 determines orbital data 154 for one or more of the constellation satellites 102.

At 706 a set of available constellation OTs 122 are determined. For example, one or more of the operations described with regard to FIG. 6 may be performed to determine the set of available constellation OTs 122.

In some implementations, the management system 150 may pre-calculate and cache information before receiving ISL request data 172. This pre-calculation and caching may reduce latency associated with processing received ISL request data 172.

At 708 cached contact window data is determined based on the registered 3P OTs 122, the orbital data 154, the 3P orbital data 188, and the available constellation OTs 122. The cached contact window data is indicative of contact windows that may be available to 3P OTs 122.

At 754 the 3P management system 184 determines a requirement for communication resources. For example, the 3P management system 184 may determine that the 3P satellites 130 will have sensor data to transfer at a particular time. In some implementations, the 3P satellite 130 may determine the requirement for communication resources.

At 756 the 3P management system 184 determines ISL request data 172. The ISL request data 172 may comprise one or more of the parameters indicated by TABLE 3.

TABLE 3

| Parameter | Description |
| --- | --- |
| 3P Optical Terminal IDs | Identifies one or more previously registered optical terminals. Terminal registration includes definition of compatibility information (e.g. wavelengths, modulation, etc.) |
| Requested Start Time | Beginning of the time range for which the 3P wants communication services. |
| Requested Stop Time | Ending of the time range for which the 3P wants communication services. |
| Requested Transmit Committed Information Rate (CIR) | Minimum allowable rate of data traffic from 3P satellite to the constellation. May also be replaced with a rate plan identifier. A request for communication resources may be rejected if this is not satisfied. |
| Requested Receive CIR | Minimum allowable rate of data traffic from constellation to the 3P satellite. May also be replaced with a rate plan identifier. A request for communication resources may be rejected if this is not satisfied. |

TABLE 3-continued

| Parameter | Description |
| --- | --- |
| Requested Transmit Maximum Information Rate (MIR) | Maximum allowable rate of data traffic from 3P satellite to the constellation. May also be replaced with a rate plan identifier. A request for communication resources may be rejected if this is not satisfied. |
| Requested Receive MIR | Maximum allowable rate of data traffic from constellation to the 3P satellite. May also be replaced with a rate plan identifier. A request for communication resources may be rejected if this is not satisfied. |
| Minimum Acceptable Contact Window Duration | Specify minimum time range duration. Contact windows with a duration greater than this value will be returned. |
| Mode selection | Specify mode such as simple multi-window mode, advanced multi-window mode, simple flexible mode, advanced flexible mode, or other mode. |
| Contact window constraints | Specify any contact window constraints, such as contiguous, overlapping, and so forth. |

The ISL request data 172 may include other information as well. In some implementations one or more parameters shown with regard to the ISL request data 172 may be included in the 3P OT registration data 170. For example, the 3P OT registration data 170 may include the mode selection data and contact window constraints.

At 710 the management system 150 determines a set of communication parameters associated with communication between one or more constellation OTs 122 and the 3P OT 122. The set of communication parameters may comprise contact window data 174 that is determined based on the ISL request data 172 and the cached contact window data. If cached contact window data is unavailable or is deemed to be incorrect or expired, the contact window data 174 will be determined responsive to the ISL request data 172. The set of communication parameters, comprising the contact window data 174 is sent to the 3P management system 184. The set of communication parameters may include or be based on data included in one or more of the ISL request data 172, the contact window data 174, reservation request data 176, confirmation data 178, and so forth. For example, the set of communication parameters may be indicative of acquisition mode, wavelength, modulation, coding, network entry method data, and so forth.

In some implementations other data (not shown) may be exchanged between the management system 150 and the 3P management system 184.

The management system 150 may provide status information indicative of the status of processing the ISL request data 172. This may be provided as a push notification, sent to the 3P management system 184 or a poll request by the 3P management system 184. The status data may include one or more of the parameters shown with regard to TABLE 4.

TABLE 4

| Parameter | Description |
| --- | --- |
| Ephemerides Update ID | Identifies the ephemerides update request associated with this notification. |
| Status Code | Indicates in-progress, success, or a specific error code if the calculations failed. |
| Percent Complete | This indicates progress of the contact window calculations if they are still in progress. |

In some situations the 3P management system 184 may provide 3P orbital data 188 that changes previously provided 3P orbital data 188. For example, the 3P satellites 130 may have maneuvered or been perturbed and the associated ephemerides have changed. Such a change in the 3P orbital data 188 may occur after the ISL request data 172 has been sent to the management system 150.

The 3P management system 184 may send updated 3P orbital data 188. Based on this updated 3P orbital data 188, the management system 150 may determine that one or more previously provided contact windows specified in contact window data 174 or previously reserved contact windows indicated by the reservation request data 176 are no longer valid. Contact windows may also be deemed invalid for other reasons. For example, a constellation OT 122 previously reserved may be malfunctioning or otherwise unavailable, a constellation satellite 102 hosting the constellation OT 122 associated with the contact window may have had to maneuver, and so forth.

The management system 150 may send to the 3P management system 184 data indicative of these now-invalid contact windows. This update may include one or more of the parameters shown with regard to TABLE 5.

TABLE 5

| Parameter | Description |
|---|---|
| Invalidated Contact Windows | An array of one or more structures containing the following parameters. |
| Contact Window IDs | Identifies the contact windows that have been invalidated. |
| Reason Code | Indicates the reason the contact window was invalidated. |

The management system 150 may be operated in different operating modes that provide different contact window data 174 or other information. These operating modes include simple multi-window mode, an advanced multi-window mode, a simple flexible mode, an advanced flexible mode, or combinations thereof. During operation, the management system 150 may respond to a plurality of incoming ISL request data 172 that each specify different operating modes. For example, first ISL request data 172(1) may utilize the simple multi-window mode while second ISL request data 172(2) may utilize the advanced flexible mode.

The simple multi-window mode (SMWM) allows the 3P management system 184 to receive contact window data 174 within a specified contact time range. The 3P management system 184 may then determine, based on the contact window data 174, reduced contact window data 426. The reduced contact window data 426 may then be included in the reservation request data 176.

In the SMWM the 3P management system 184 is responsible for selecting contact windows 470 that are valid for establishing the 3P ISL 198 given the 3P satellite's 130 orientation, 3P OT 122 FOR 304, and so forth. A contact window 470 may be deemed valid as described with regard to FIG. 3, such as where the respective FOR 304 are directed towards each other.

In the SMWM, the data determined with regard to operations associated with the management system 150 are described with regard to TABLE 6. The data determined with regard to operations associated with the 3P management system 184 are described with regard to TABLE 7.

TABLE 6

Management System 150 Determined Data

Constellation satellite to 3P range within threshold
Constellation satellite to 3P range rate within threshold
Constellation satellite optical terminal available (unallocated)
Constellation satellite optical terminal az/el rotation rate within threshold
Constellation satellite optical terminal field of regard covers 3P satellite
Constellation satellite optical terminal sun angle outside exclusion threshold
Constellation network route availability
Earth obstructions determined
Physical exclusion zones determined (e.g. spacecraft structure, obstruction such as Earth, etc.)
. . .

TABLE 7

3 P Management System 184 Determined Data

3 P to constellation satellite range within threshold
3 P to constellation satellite range rate within threshold
3 P satellite optical terminal az/el rotation rate within threshold
3 P optical terminal field of regard covers constellation satellite
3 P optical terminal sun angle outside exclusion threshold
Contact window selection The ISL request data 172 associated with the SMWM may comprise that described above with regard to TABLE 3.

In the SMWM, the contact window data 174 determined by the management system 150 and sent to the 3P management system 184 may comprise one or more of the parameters in TABLE 8.

TABLE 8

| Parameter | Description |
|---|---|
| Service Request ID | Uniquely identifies the request. Used to accept contact windows in subsequent steps. |
| Status Codes | Indicates success or provides specific error codes if no contact windows were returned. |
| Possible Contact Windows | An array of zero or more structures containing the following parameters. |
| Contact Window ID | Uniquely identifies the possible contact window. Identifiers are specific to each response. Used by the 3 P to accept or reject the contact window. This identifier can also be used by the 3 P to request up-to-date constellation satellite ephemerides shortly before the contact window. |
| 3 P Optical Terminal ID | Identifies the 3 P optical terminal that applies to this contact window. |
| Window Start Time | The beginning time of the contact window. |
| Window Stop Time | The ending time of the contact window. |
| Expected Latency (Seconds) | The maximum expected latency from the 3 P tsatellite hrough the constellation network for this contact window. |
| Constellation Satellite Ephemerides | Orbital data such as constellation satellite's state vectors for the contact window. Used by the t 3 P satellite to poin their optical terminal. |
| Cost | Cost data (when available). |
| Acquisition Mode | The acquisition mode the 3 P terminal should use for this contact. (E.g., Type 1 (leader), Type 2 (follower), and so forth.). |
| Network Entry Data | Network entry data that the 3 P provides to their satellite to facilitate network entry for this contact. (E.g., cryptographic keys.) |

In some implementations, the contact windows 470 and associated resources such as constellation OTs 122 that are included in the contact window data 174 may be deemed to be unavailable for responses to other ISL requests. For example, the contact windows 470 specified in the contact window data 174 may be temporarily reserved until expiration of a timeout time limit, until associated reservation request data 176 is received, or other conditions are satisfied.

As described above, the reservation request data 176 may specify a subset of one or more of the contact windows 470 included in the contact window data 174.

The reservation request data 176 may include one or more of the parameters specified in TABLE 9.

TABLE 9

| Parameter | Description |
| --- | --- |
| Service Request ID | Identifies the service request that the 3 P is responding to. |
| Accepted Contact Windows | An array of one or more structures containing the following parameters. |
| Contact Window ID | Identifies the contact window being accepted. |
| Refined Start Time | The beginning of a reduced contact window, within the originally specified contact window. (If omitted, assumes the entire contact window is used.) |
| Refined Stop Time | The ending of the reduced contact window, within the originally specified contact window. (If omitted, assumes the entire contact window is used.) |

With regard to the SMWM, the 3P OT registration data 170 may comprise parameters such as the 3P satellite ID, the wavelength compatibility, and the network entry methods as described above with regard to TABLE 1.

The advanced multi-window mode (AMWM) is a modification of the SMWM in which the management system 150 performs some of the operations that were performed by the 3P management system 184 in the SMWM. In particular, in the AMWM the management system 150 performs the operations associated with determining whether the 3P OT 122 will be able to establish the 3P ISL 198.

In the AMWM, the data determined with regard to operations associated with the management system 150 are described with regard to TABLE 10. The data determined with regard to operations associated with the 3P management system 184 are described with regard to TABLE 11.

TABLE 10

Management System 150 Determined Data

Constellation satellite to 3 P range within threshold
Constellation satellite to 3 P range rate within threshold
Constellation satellite optical terminal available (unallocated)
Constellation satellite optical terminal az/el rotation rate within threshold
Constellation satellite optical terminal field of regard covers 3 P satellite
Constellation satellite optical terminal sun angle outside exclusion threshold
Constellation network route availability
Determine Earth obstructions
Physical exclusion zones determined
3 P to constellation satellite range within threshold
3 P to constellation satellite range rate within threshold
3 P satellite optical terminal az/el rotation rate within threshold
3 P optical terminal field of regard covers constellation satellite
3 P optical terminal sun angle outside exclusion threshold

TABLE 11

3 P Management System 184 Determined Data

Contact window selection. May be based on contact window overlap, number of contact windows available, duration of contact windows, and so forth.

In the AMWM the 3P management system 184 may send information as part of the 3P orbital data 188. This data may include one or more of the parameters described in TABLE 12.

TABLE 12

| Parameter | Description |
| --- | --- |
| 3 P Satellite Attitude Reference Frame | Identifies a reference frame in which the following attitude data is specified. Example frames include Earth Centered Inertial (ECI), Radial Intrack Crosstrack (RIC), and Earth Centered Earth Fixed (ECEF). |
| 3 P Satellite Attitude Data | An array of one or more structures containing the following parameters. |
| Timestamp | The timestamp associated with the quaternion. |
| Attitude Quaternion | The quaternion that describes rotation between the reference frame and the 3 P satellite's body frame for the given timestamp. |

If the 3P management system 184 specifies multiple quaternions, a spherical linear interpolation (SLERP) algorithm may be used to determine the orientation between the given quaternions. The management system 150 may use these quaternions and the 3P OT 122 FOR 304 information to determine if the 3P OT 122 is valid for establishing a 3P ISL 198 with a constellation OT 122.

The 3P management system 184 may include sufficient quaternions to adequately represent the orientation of the 3P satellite 130 over the requested time range in the ISL request data 172. For example, if the 3P satellite 130 will maintain a fixed orientation in the reference frame, a single quaternion may be included. In another example, if the 3P satellite 130 will be constantly slewing, a plurality of quaternions may be included, such as one quaternion every minute.

With regard to the AMWM, the 3P OT registration data 170 may comprise parameters such as the FOR references, maximum azimuth/elevation rotation rates, and so forth as described above with regard to TABLE 1.

The simple flexible mode (SFM) allows the 3P management system 184 to receive contact window data 174 that meets specified data transfer requirements. Based on this information, the management system 150 selects contact windows 470 for inclusion in the contact window data 174. The 3P management system 184 may then accept or decline the contact window(s) 470 specified by the contact window data 174.

The ISL request data 172 associated with the SFM may comprise one or more of the following parameters indicated by TABLE 13:

TABLE 13

| Parameter | Description |
| --- | --- |
| 3 P Optical Terminal IDs | Identifies one or more previously registered 3 P optical terminals. |
| 3 P Satellite Ephemerides | Orbital data comprising the 3 P satellite's state vectors. |
| Requested Start Time | The beginning of the time range for which the 3 P wants communication services. |
| Requested Stop Time | The ending of the time range for which the 3 P wants communication services. |
| Requested Transmit Size (Mb) | The total amount of data to be transmitted from the 3 P satellite over all the contact windows. |
| Requested Receive Size (Mb) | The total amount of data to be received by the 3 P satellite over all the contact windows. |
| Contact Window Constraint Mode | Specifies additional constraints to be placed on the returned contact windows. No Constraints - The API will return |

TABLE 13-continued

| Parameter | Description |
| --- | --- |
| | one or more contact windows that may or may not be adjacent to each other in time.<br>Contiguous Constraint - The API will return one or more contact windows that are adjacent to each other in time (if they can meet the data transfer requirements).<br>Single Constraint - The API will return one contact window (if it can meet the data transfer requirements). |
| Minimum Acceptable Contact Window Duration | Only contact windows with a duration greater than this value will be returned. |

Responsive to the ISL request data 172, the contact window data 174 returned in the SFM comprises contact windows 470 that satisfy the data transfer need, and may not include all contact windows available within the requested time range, such as within the SMWM. For example, in the SFM, the contact window data 174 may comprise that depicted with regard to graphs 502, 522, or 542, depending upon constraints.

If the management system 150 is unable to determine a set of contract windows 470 that would satisfy one or more conditions associated with the ISL request data 172, such as the requested data transfer size or contact window constraint mode, one or more error codes may be returned. For example, the error codes may indicate a range threshold exceeded, range rate threshold exceeded, single contact window unavailable, contiguous contact windows unavailable, and so forth. Responsive to the error codes returned, the 3P management system 184 may determine and send new ISL request data 172.

Similar to that described above, the 3P management system 184 may then determine, based on the contact window data 174 the reservation request data 176.

The advanced flexible mode (AFM) is a modification of the SFM in which the management system 150 performs some of the operations that were performed by the 3P management system 184 in the SFM. In particular, in the AFM the management system 150 performs the operations associated with determining whether the 3P OT 122 will be able to establish the 3P ISL 198. To perform these operations, the operations and parameters such as described above with regard to the AMWM may be used.

Other constraints may be imposed in the determination of the contact window data 174. For example, some minimum time may be required to allow for operations such as sending the command data 360 and configuring the constellation OT 122 to prepare for the 3P ISL 198. In another example, orbital data 154 is subject to change over time due to various factors. As a result, a maximum time constraint may be applied to ISL request data 172, rejecting those requests that attempt to schedule 3P ISL 198 too far in the future. The management system 150 may return an error code in response to ISL request data 172 that does not satisfy these constraints.

At 758 the 3P management system 184 determines, based on the contact window data 174, reservation request data 176. For example, the 3P management system 184 may determine the reduced contact window data 426 as described with regard to FIG. 4 and send this information as part of the reservation request data 176.

At 712 the management system 150 receives the reservation request data 176 and allocates ISL resources based on the reservation request data 176. The allocation may include committing particular constellation OTs 122 at particular times to provide 3P ISL 198 as specified by the contact windows 470 specified by the reservation request data 176.

At 714 the management system 150 determines confirmation data 178 indicative of the allocated ISL resources. The confirmation data 178 is then sent to the 3P management system 184. The confirmation data 178 may comprise a set of communication parameters associated with communication between one or more constellation OTs 122 and the 3P OT 122 that have been allocated or reserved for use.

At 716 the management system 150 determines first command data 360 based on the allocated ISL resources. For example, the first command data 360 may comprise instructions to operate one or more actuators to direct the FOR 304 of a specified OT 122 in a specified direction at a specified time, operate an optical transmitter, operate an optical receiver, and so forth. In some implementations the first command data 360 may operate other systems as well. For example, the first command data 360 may operate the maneuvering system 208 of the constellation satellite 102.

In some implementations, before the 3P ISL 198 is scheduled to begin, one or more of the management system 150 or the 3P management system 184 may send orbital data to the other system. For example, the orbital mechanics system 152 may determine updated orbital data 154 that is sent to the 3P management system 184. Continuing the example, the 3P orbital mechanics system 186 may determine updated 3P orbital data 188 that is sent to the management system 150. The updated orbital data may be used to confirm that the establishment of the 3P ISL 198 is still possible, and to facilitate establishment of the 3P ISL 198. For example, the updated orbital data may be used to point the FOR 304 of a first optical terminal 122 towards a second optical terminal 122.

In some situations the updated orbital data may result in a cancellation of the allocated ISL resources. For example, if the updated 3P orbital data 188 occurs after an unplanned maneuver that has moved the 3P satellites 130 into a position for which the 3P ISL 198 is not possible, the ISL request system 162 may cancel the reservation of the ISL resources, and send cancellation data to the 3P management system 184.

In some situations the allocation of ISL resources may be cancelled before or during establishing the 3P ISL 198. For example, if the constellation satellite 102 or the OT 122 associated with the confirmation data 178 is malfunctioning, cancellation data may be sent.

At 718 the first command data 360 is sent to one or more satellites 102 of the constellation. The satellites 102 may then execute the first command data 360.

At 760 the 3P management system 184 receives the confirmation data 178 and determines second command data 362 based on the confirmation data 178. For example, the command data 362 may comprise instructions to operate one or more actuators to direct the FOR 304 of a specified 3P OT 122 in a specified direction at a specified time, operate an optical transmitter, operate an optical receiver, and so forth. In some implementations the second command data 362 may operate other systems as well. For example, the second command data 362 may operate a maneuvering system of the 3P satellite 130.

At 762 the second command data 362 is sent to one or more 3P satellites 130 of the constellation. The 3P satellites 130 may then execute the second command data 362.

During operation of the management system 150 additional API "methods" or requests may be provided. For example, the ISL request system 162 may be configured to accept the following requests and provide the corresponding responses.

The 3P management system 184 may send a request to the management system 150 for constellation orbital data 154 comprising the parameter(s) specified in TABLE 14. For example, the 3P management system 184 may use this data to determine if the constellation satellites 102 and their associated OTs 122 that are associated with a contact window 470 in the contact window data 174 are valid for the 3P ISL 198.

TABLE 14

API REQUEST FROM 3 P TO CONSTELLATION ORBITAL DATA 154

| Parameter | Description |
| --- | --- |
| Contact Window IDs | Identifies the contact windows for which the 3 P wants to retrieve the constellation satellite orbital data 154 such as ephemerides. |

Responsive to the request, the management system 150 may send to the 3P management system 184 a response including constellation orbital data 154 comprising the parameter(s) specified in TABLE 15. For example, the orbital mechanics system 152 may provide the constellation orbital data 154 for the constellation satellites 102 associated with the specified contact window IDs.

TABLE 15

| Parameter | Description |
| --- | --- |
| Constellation Satellite Orbit Data | An array of one or more structures containing the following parameters. |
| Contact Window ID | Identifies the contact window for which the ephemerides are valid. |
| Constellation satellite ephemerides | Orbital data comprising the constellation satellite's state vectors for the contact window. Used by the 3 P to point their optical terminal. |

The 3P management system 184 may send a request to update 3P orbital data 188 to the management system 150 comprising the parameter(s) specified in TABLE 16. In some implementations the 3P orbital mechanics system 186 may determine the 3P orbital data 188.

TABLE 16

| Parameter | Description |
| --- | --- |
| 3 P Satellite ID | Identifies the 3 P satellite associated with this request. |
| 3 P Satellite Ephemerides | Orbital data comprising the 3 P satellite's state vectors for the contact window. |

Responsive to the request, the management system 150 may send to the 3P management system 184 a response indicating acceptance of the updated 3P orbital data 188.

The 3P management system 184 may send a request to cancel a previously provided contact window 470. The request to cancel a contact window 470 may comprise the parameter specified in TABLE 17. For example, a previously provided contact window 470 may be cancelled due to a maneuver of the 3P satellite 130, lack of data to transfer, and so forth.

TABLE 17

| Parameter | Description |
| --- | --- |
| Contact Window IDs | Identifies the contact windows to be canceled. |

The management system 150 may determine that a contact window 470 is no longer valid. A contact window invalid notification may comprise the parameter(s) specified in 5. For example, one or more of the constellation orbital data 154 or the 3P orbital data 188 may have changed, due to a malfunction, and so forth.

The 3P management system 184 may send a request to query the currently accepted contact windows 470, such as those that have been reserved. The request may comprise the parameter specified in TABLE 18.

TABLE 18

| Parameter | Description |
| --- | --- |
| Contact Window IDs | Identifies the contact windows to be queried. |

Responsive to the request, the management system 150 may send to the 3P management system 184 a response comprising one or more of the parameters specified in TABLE 19.

TABLE 19

| Parameter | Description |
| --- | --- |
| Pending Contact Windows | An array of one or more structures containing the following parameters. |
| Contact Window ID | Identifies the contact window for which the ephemerides is valid. |
| 3 P Satellite ID | Identifies the 3 P satellite associated with this contact window. |
| 3 P Optical Terminal ID | Identifies the 3 P optical terminal that applies to this contact window. |
| Window Start Time | The beginning of the contact window. |
| Window Stop Time | The ending of the contact window. |
| Constellation Satellite Ephemerides | Orbital data comprising the constellation satellite's state vectors for the contact window. Used by the 3 P to point their optical terminal. |
| Network Entry Data | Network entry data that the 3 P provides to their satellite to facilitate network entry for this contact. (E.g., cryptographic keys.) |

The 3P management system 184 may send a query contact window real-time status query to obtain information about one or more contact windows 470. The request may comprise the parameter specified in TABLE 16.

Responsive to the request, the management system 150 may send to the 3P management system 184 a response comprising one or more of the parameters specified in TABLE 20.

TABLE 20

| Parameter | Description |
| --- | --- |
| State | Indicates the last state of the contact window. Status may include, but are not limited to the following values: Pending, Slewing, Coarse Acquisition Started, Coarse Acquisition Complete, Fine Acquisition Started, Fine Acquisition Complete, Active, Complete (Success), Complete (Fail), Invalidated. |
| Total Data Transmitted (Mb) | The total number of bytes that flowed from the 3 P satellite into the Constellation network for this contact window. |
| Total Data Received (Mb) | The total number of bytes that flowed from the Constellation network into the 3 P satellite for this contact window. |
| Data Transmit Rate (Mbps) | The current rate of data flowing from the 3 P satellite into the Constellation network. Average rate over past specified number of seconds specified. |
| Data Receive Rate (Mbps) | The current rate of data flowing from the Constellation network into the 3 P satellite. Average rate over past specified number of seconds specified. |
| Total Packets Transmitted | The total number of packets that flowed from the 3 P satellite into the Constellation network for this contact window. |
| Total Packets Received | The total number of packets that flowed from the Constellation network into the 3 P satellite for this contact window. |
| Packet Loss (%) | The current measured packet loss. Average loss over past specified number of seconds. |
| Latency (Seconds) | The current measured latency from the 3 P satellite through the Constellation network. Average latency over past specified number of seconds. |
| Optical Link Quality Metrics | Data indicating the quality of the optical link. |

The 3P management system 184 may send a query contact window history that provides information about previously used contact windows 470. The request may comprise the parameter specified in TABLE 16.

Responsive to the request, the management system 150 may send to the 3P management system 184 a response comprising one or more of the parameters specified in TABLE 21.

TABLE 21

| Parameter | Description |
| --- | --- |
| Contact Window History Records | An array of one or more structures containing the following parameters. |
| Contact Window ID | Identifies the contact window for which the ephemerides is valid. |
| 3 P Satellite ID | Identifies the 3 P satellite associated with this contact window. |
| 3 P Optical Terminal ID | Identifies the 3 P optical terminal that applies to this contact window. |
| State Flags | A bitfield that indicates all the states observed during the contact window. For example, this could be a bitfield that shows that the Constellation OHA started to slew, but coarse acquisition did not complete. |
| Expected Start Time | The expected beginning of the contact window. |
| Expected Stop Time | The expected ending of the contact window. |
| Actual Start Time | The actual beginning of the contact window (when network data started flowing). |
| Actual Stop Time | The actual ending of the contact window (when network data stopped flowing). |
| Total Data Transmitted (Mb) | The total number of bytes that flowed from the 3 P satellite into the Constellation network for this contact window. |
| Total Data Received (Mb) | The total number of bytes that flowed from the Constellation network into the 3 P satellite for this contact window. |
| Average Transmit Rate (Mbps) | The average rate of data that flowed from the 3 P satellite into the Constellation network. Average rate over entire contact window. |
| Average Receive Rate (Mbps) | The average rate of data that flowed from the Constellation network into the 3 P satellite. Average rate over entire contact window. |
| Maximum Transmit Rate (Mbps) | The peak rate of data that flowed from the 3 P satellite into the Constellation network for this contact window. |
| Maximum Receive Rate (Mbps) | The peak rate of data that flowed from the Constellation network into the 3 P satellite for this contact window. |
| Packet Loss (%) | The packet loss measured over the entire contact window. |

TABLE 21-continued

| Parameter | Description |
| --- | --- |
| Average Latency (Seconds) | The average measured latency for this contact window. |
| Minimum Latency (Seconds) | The smallest measured latency for this contact window. |
| Maximum Latency (Seconds) | The largest measured latency for this contact window. |

In some implementations, the API may support other requests and provide other responses.

The circuitry, processes, and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first set of one or more processors executing instructions to:
determine a constellation of satellites, wherein at least a portion of the satellites in the constellation include a first set of optical terminals (OTs);
determine first orbital data associated with the constellation of satellites;
determine a first third-party (3P) OT that is associated with a 3P satellite;
receive, from a third party, an optical intersatellite link (OISL) request that is associated with the first 3P OT;
determine second orbital data associated with the 3P satellite;
determine, based on the first set of OTs, a first set of available OTs;
determine, based on the first orbital data and the second orbital data, a first OT of the first set of available OTs;
determine a first set of communication parameters associated with communication between the first OT and the first 3P OT at a first time; and
send, to the third party, confirmation data indicative of the first set of communication parameters.

2. The system of claim 1, further comprising:
the first set of one or more processors executing instructions to:
receive 3P OT registration request data comprising one or more of:
a 3P satellite identifier,
wavelength compatibility data that is indicative of one or more wavelengths the first 3P OT is capable of operating on;
network entry method data that is indicative of how the 3P satellite will connect to a satellite in the constellation;
a field of regard (FOR) reference azimuth vector that is indicative of a first 3P OT's azimuth rotation axis when both azimuth and elevation angles are zero;
a FOR reference elevation vector that is indicative of a first 3P OT's elevation rotation axis when both the azimuth and elevation angles are zero;
a set of FOR polygon vertices that is indicative of a set of spherical coordinates that describe a FOR polygon for the first 3P OT relative to a coordinate system defined by the FOR reference azimuth vector and the FOR reference elevation vector;

a maximum azimuth rotation rate that is indicative of a maximum rate at which the first 3P OT is able to rotate with respect to an azimuth axis;

a maximum elevation rotation rate that is indicative of a maximum rate at which the first 3P OT is able to rotate with respect to an elevation axis; or a sun exclusion angle that is indicative of a minimum angle between a boresight of the first 3P OT and a sun angle that the first 3P OT is able to operate with; and determine the first 3P OT based on the 3P OT registration request data.

3. The system of claim 1, wherein to determine the first set of available OTs, the first set of one or more processors execute instructions to:

determine, from among the first set of OTs, a second set of OTs that are operable;

determine, from among the second set of OTs, a third set of OTs that are unreserved;

determine, from among the third set of OTs, a fourth set of OTs that are compatible with the first 3P OT;

determine, from among the fourth set of OTs, a fifth set of OTs for which a link with the first 3P OT is physically possible;

determine, from among the fifth set of OTs, a sixth set of OTs that, if used, maintain a connected mesh within the constellation;

determine, from among the sixth set of OTs, a seventh set of OTs associated with possible routes through the connected mesh that have greater than a threshold capacity available; and determine, from among the seventh set of OTs, the first set of available OTs.

4. The system of claim 1, further comprising:

the first set of one or more processors executing instructions to:

determine contact window data indicative of a first set of contact windows, wherein each contact window of the first set of contact windows specifies a time interval associated with one or more available OTs from the first set of available OTs;

send the contact window data;

receive reservation request data that is indicative of one or more contact windows of the first set of contact windows; and determine, based on the reservation request data, the first OT.

5. The system of claim 1, wherein:

the first orbital data is indicative of orientation of satellites within the constellation of satellites, and the second orbital data is indicative of orientation of the 3P satellite; and the system further comprising:

the first set of one or more processors executing instructions to:

determine contact window data indicative of a first set of contact windows, wherein each contact window of the first set of contact windows specifies a time interval associated with one or more available OTs from the first set of available OTs during which the first 3P OT is able to communicate with a respective one of the one or more available OTs;

send the contact window data;

receive reservation request data that is indicative of one or more contact windows of the first set of contact windows; and determine, based on the reservation request data, the first OT.

6. The system of claim 1, wherein the OISL request comprises one or more of:

a contact time range indicative of a time during which communication using the constellation is to occur;

ephemerides of the 3P satellite associated with the contact time range;

orientation data of the 3P satellite associated with the contact time range;

a first value indicative of a quantity of data for transmission from the 3P satellite;

a second value indicative of a quantity of data for transmission to the 3P satellite; or a third value indicative of whether contact windows must be contiguous;

the system further comprising:

the first set of one or more processors executing instructions to:

determine, based at least in part on the OISL request, contact window data indicative of a first set of contact windows, wherein each contact window of the first set of contact windows specifies a time interval associated with one or more available OTs from the first set of available OTs;

send the contact window data;

receive reservation request data that is indicative of one or more contact windows of the first set of contact windows; and determine, based on the reservation request data, the first OT.

7. The system of claim 1, further comprising:

the first set of one or more processors executing instructions to:

determine, before the first time, third orbital data associated with a first satellite associated with the first OT;

determine, before the first time, fourth orbital data associated with the 3P satellite;

determine, based at least in part on the third orbital data and the fourth orbital data, one or more of:

a first field of regard (FOR) of the first OT at the first time would not include the first 3P OT, a second field of regard (FOR) of the first 3P OT at the first time would not include the first OT, a range between the first satellite and the 3P satellite exceeds a first threshold value, a range rate of one or more of the first satellite or the 3P satellite exceeds a second threshold value, or a sun is within a sun exclusion angle of one or more of the first OT or the first 3P OT; and send, to the third party, cancellation data indicative of a cancellation of the first set of communication parameters.

8. A method comprising:

determining a constellation of satellites, wherein at least a portion of the satellites in the constellation include a first set of optical terminals (OTs);

determining first orbital data associated with the constellation of satellites;

determining a first third-party (3P) OT that is associated with a 3P satellite;

receiving, from a third party, an optical intersatellite link (OISL) request that is associated with the first 3P OT;

determining second orbital data associated with the 3P satellite;

determining, based on the first set of OTs, a first set of available OTs;
determining, based on the first orbital data and the second orbital data, a first OT of the first set of available OTs;
determining a first set of communication parameters associated with communication between the first OT and the first 3P OT at a first time; and
sending, to the third party, confirmation data indicative of the first set of communication parameters.

9. The method of claim 8, further comprising:
receiving 3P OT registration request data comprising one or more of:
  a 3P satellite identifier indicative of the 3P satellite,
  wavelength compatibility data that is indicative of one or more wavelengths the first 3P OT is capable of operating on;
  network entry method data that is indicative of how the 3P satellite will connect to a constellation satellite;
  a field of regard (FOR) reference azimuth vector that is indicative of a first 3P OT's azimuth rotation axis when both azimuth and elevation angles are zero;
  a FOR reference elevation vector that is indicative of a first 3P OT's elevation rotation axis when both the azimuth and elevation angles are zero;
  a set of FOR polygon vertices that is indicative of a set of spherical coordinates that describe a FOR polygon for the first 3P OT relative to a coordinate system defined by the FOR reference azimuth vector and the FOR reference elevation vector;
  a maximum azimuth rotation rate that is indicative of a maximum rate at which the first 3P OT is able to rotate with respect to an azimuth axis;
  a maximum elevation rotation rate that is indicative of a maximum rate at which the first 3P OT is able to rotate with respect to an elevation axis; or
  a sun exclusion angle that is indicative of a minimum angle between a boresight of the first 3P OT and a sun angle that the first 3P OT is able to operate with; and
determining the first 3P OT based on the 3P OT registration request data.

10. The method of claim 8, further comprising:
determining first data indicative of OTs that are operable, based on the first set of OTs;
determining, based on the first data, second data that is indicative of unreserved OTs;
determining, based on the second data, third data that is indicative of OTs that are compatible with the first 3P OT;
determining, based on the third data, fourth data indicative of OTs for which a link with the first 3P OT is physically possible;
determining, based on the fourth data, fifth data indicative of OTs that, if used, maintain a connected mesh within the constellation;
determining, based on the fifth data, sixth data indicative of OTs associated with possible routes through the connected mesh that have greater than a threshold capacity available; and
determining, based on the sixth data, the first set of available OTs.

11. The method of claim 8, further comprising:
determining contact window data indicative of a first set of contact windows, wherein each contact window of the first set of contact windows specifies a time interval associated with one or more available OTs from the first set of available OTs;
sending the contact window data;
receiving reservation request data that is indicative of one or more contact windows of the first set of contact windows; and
determining the first OT of the first set of available OTs based on the reservation request data.

12. The method of claim 8, wherein:
the first orbital data is indicative of orientation of satellites within the constellation of satellites, and
the second orbital data is indicative of orientation of the 3P satellite; and
the method further comprising:
determining contact window data indicative of a first set of contact windows, wherein each contact window of the first set of contact windows specifies a time interval associated with one or more available OTs from the first set of available OTs during which the first 3P OT is determined as being able to communicate with a respective one of the one or more available OTs;
sending the contact window data;
receiving reservation request data that is indicative of one or more contact windows of the first set of contact windows; and
determining the first OT of the first set of available OTs based on the reservation request data.

13. The method of claim 8, wherein the OISL request comprises one or more of:
a contact time range indicative of a time during which communication using the constellation is to occur;
ephemerides of the 3P satellite associated with the contact time range;
orientation data of the 3P satellite associated with the contact time range;
a first value indicative of a quantity of data for transmission from the 3P satellite;
a second value indicative of a quantity of data for transmission to the 3P satellite; or
a third value indicative of whether contact windows must be adjacent in time; and
the method further comprising:
determining contact window data indicative of a first set of contact windows, wherein each contact window of the first set of contact windows specifies a time interval associated with one or more available OTs from the first set of available OTs;
sending the contact window data;
receiving reservation request data that is indicative of one or more contact windows of the first set of contact windows; and
determining the first OT of the first set of available OTs based on the reservation request data.

14. The method of claim 8, further comprising:
determining, before the first time, third orbital data associated with a first satellite associated with the first OT;
determining, before the first time, fourth orbital data associated with the 3P satellite;
determining, based at least in part on the third orbital data and the fourth orbital data, one or more of:
  a first field of regard (FOR) of the first OT at the first time would not include the first 3P OT,
  a second FOR of the first 3P OT at the first time would not include the first OT,
  a range between the first satellite and the 3P satellite exceeds a first threshold value,
  a range rate of one or more of the first satellite or the 3P satellite exceeds a second threshold value, or a sun is within a sun exclusion angle of one or more of the first OT or the first 3P OT; and sending, to the third party, cancellation data indicative of a cancellation of the first set of communication parameters.

15. The method of claim 8, further comprising:
operating the first OT based on the first set of communication parameters.

16. A system comprising:
a constellation of satellites, wherein at least a portion of the satellites in the constellation include a first set of communication terminals (CTs); and
a first set of one or more processors executing instructions to:
   determine first orbital data associated with the constellation of satellites;
   determine a first third-party (3P) CT that is associated with a 3P satellite;
   receive an intersatellite link (ISL) request that is associated with the first 3P CT;
   determine second orbital data associated with the 3P satellite;
   determine, based on the first set of CTs, a first set of available CTs;
   determine, based on the first orbital data and the second orbital data, a first CT of the first set of available CTs;
   determine a first set of communication parameters associated with communication between the first CT and the first 3P CT;
   send confirmation data indicative of the first set of communication parameters; and
   operate the first CT based on the first set of communication parameters.

17. The system of claim 16, further comprising:
the first set of one or more processors executing instructions to:
   receive 3P CT registration request data comprising one or more of:
      a 3P satellite identifier,
      wavelength compatibility data that is indicative of one or more wavelengths the first 3P CT is capable of operating on;
      network entry method data that is indicative of how the 3P satellite will connect to a satellite in the constellation;
      a field of regard (FOR) reference azimuth vector that is indicative of a first 3P CT's azimuth rotation axis when both azimuth and elevation angles are zero;
      a FOR reference elevation vector that is indicative of a first 3P CT's elevation rotation axis when both the azimuth and elevation angles are zero;
      a set of FOR polygon vertices that is indicative of a set of spherical coordinates that describe a FOR polygon for the first 3P CT relative to a coordinate system defined by the FOR reference azimuth vector and the FOR reference elevation vector;
      a maximum azimuth rotation rate that is indicative of a maximum rate at which the first 3P CT is able to rotate with respect to an azimuth axis;
      a maximum elevation rotation rate that is indicative of a maximum rate at which the first 3P CT is able to rotate with respect to an elevation axis; or
      a sun exclusion angle that is indicative of a minimum angle between a boresight of the first 3P CT and a sun angle that the first 3P CT is able to operate with; and
   determine the first 3P CT based on the 3P CT registration request data.

18. The system of claim 16, further comprising:
the first set of one or more processors executing instructions to:
   determine contact window data indicative of a first set of contact windows, wherein each contact window of the first set of contact windows specifies a time interval associated with one or more available CTs from the first set of available CTs;
   send the contact window data;
   receive reservation request data that is indicative of one or more contact windows of the first set of contact windows; and
   determine, based on the reservation request data, the first CT.

19. The system of claim 16, wherein:
the first orbital data is indicative of orientation of satellites within the constellation of satellites, and
the second orbital data is indicative of orientation of the 3P satellite; and
the system further comprising:
the first set of one or more processors executing instructions to:
   determine contact window data indicative of a first set of contact windows, wherein each contact window of the first set of contact windows specifies a time interval associated with one or more available CTs from the first set of available CTs during which the first 3P CT is able to communicate with a respective one of the one or more available CTS;
   send the contact window data;
   receive reservation request data that is indicative of one or more contact windows of the first set of contact windows; and
   determine, based on the reservation request data, the first CT.

20. The system of claim 16, wherein the ISL request comprises one or more of:
   a contact time range indicative of a time during which communication using the constellation is to occur;
   ephemerides of the 3P satellite associated with the contact time range;
   orientation data of the 3P satellite associated with the contact time range;
   a first value indicative of a quantity of data for transmission from the 3P satellite;
   a second value indicative of a quantity of data for transmission to the 3P satellite; or
   a third value indicative of whether contact windows must be contiguous;
the system further comprising:
the first set of one or more processors executing instructions to:
   determine, based at least in part on the ISL request, contact window data indicative of a first set of contact windows, wherein each contact window of the first set of contact windows specifies a time interval associated with one or more available CTs from the first set of available CTs;
   send the contact window data;
   receive reservation request data that is indicative of one or more contact windows of the first set of contact windows; and
   determine, based on the reservation request data, the first CT.

* * * * *